United States Patent [19]

Miyamoto et al.

[11] Patent Number: 5,717,969
[45] Date of Patent: Feb. 10, 1998

[54] LENS BARREL WITH FLEXIBLE PRINTED CIRCUIT BOARDS

[75] Inventors: Hidenori Miyamoto, Urayasu; Isao Soshi, Tokyo; Minoru Kato; Junichi Omi, both of Kawasaki; Yoshihiro Takeuchi, Tokyo, all of Japan

[73] Assignee: Nikon Corporation, Tokyo, Japan

[21] Appl. No.: 795,764

[22] Filed: Feb. 6, 1997

Related U.S. Application Data

[63] Continuation of Ser. No. 327,398, Oct. 21, 1994, abandoned.

[30] Foreign Application Priority Data

| Oct. 21, 1993 | [JP] | Japan | 5-263702 |
| Oct. 21, 1993 | [JP] | Japan | 5-263703 |
| Oct. 21, 1993 | [JP] | Japan | 5-263704 |
| Dec. 10, 1993 | [JP] | Japan | 5-310739 |
| Dec. 22, 1993 | [JP] | Japan | 5-324393 |
| Feb. 3, 1994 | [JP] | Japan | 6-030819 |

[51] Int. Cl.$^6$ .............................. G03B 17/00; G03B 7/00
[52] U.S. Cl. .............................................. 396/535; 396/542
[58] Field of Search ....................................... 354/286, 485; 361/752, 755, 756, 784, 796; 396/529-32, 535, 542

[56] References Cited

U.S. PATENT DOCUMENTS

| 3,670,639 | 6/1972 | Harnden, Jr. | 95/11 L |
| 4,804,331 | 2/1989 | Eguchi et al. | 439/162 |
| 4,951,083 | 8/1990 | Okura et al. | 354/485 |
| 4,999,656 | 3/1991 | Shimizu et al. | 354/195.12 |
| 5,079,577 | 1/1992 | Nomura | 354/233 |
| 5,220,375 | 6/1993 | Ishida et al. | 354/419 |
| 5,384,690 | 1/1995 | Davis et al. | 361/789 |
| 5,453,807 | 9/1995 | Iizuka | 354/195.1 |

OTHER PUBLICATIONS

"Photographic Industries", vol. 48, No. 497, published by Syashin Kogyo Shuppan, 1990, pp. 80–83 and 122.

*Primary Examiner*—Michael L. Gellner
*Assistant Examiner*—Daniel Chapik
*Attorney, Agent, or Firm*—Oliff & Berridge

[57] ABSTRACT

A lens barrel is provided with a lens group that can move against a camera main body, an electrical device that can move with the lens group, and a plurality of flexible printed circuit boards arranged one on top of the other within a space inside the lens barrel, in order to electrically connect the electrical device to an electrical device that is provided outside the lens barrel.

42 Claims, 16 Drawing Sheets

LENS BARREL WITH FLEXIBLE PRINTED CIRCUIT BOARDS

This is a continuation of Application Ser. No. 08/327,398 filed Oct. 21, 1994, now abandoned.

BACKGROUND OF THE INVENTION

1. Field of the Invention

The present invention relates to a lens barrel provided with a lens group that can move in a direction of an optical axis, and in particular, a lens barrel in which an electrical device that is integrated with the individual lens group is electrically connected with another electrical device disposed outside the lens barrel via a flexible printed circuit board.

2. Description of the Related Art

As a means for electrically connecting a plurality of electrical devices (for example, a shutter drive device, a focusing motor, a zoom motor and the like) which are provided within the lens barrel of the photographic lens to an electrical device (control IC) which is provided outside the lens barrel in the prior art, a so-called flexible printed circuit board (FPC) is used. An FPC, one end of which is connected to a board within the lens barrel where electrical devices are mounted, is led around within the space inside the lens barrel by being bent a plurality of times. The other end of the FPC is connected to a board provided outside the lens barrel. The control IC is mounted on this board. With this, the electrical devices within the lens barrel and the electrical device outside the lens barrel are electrically connected via the wiring pattern on the FPC. The FPC becomes appropriately deformed when the electrical devices move in the direction of the optical axis as the lens groups move during zooming and the like. Because of this deformation, an excessive load is not applied to the lens groups.

However, when a plurality of electrical devices within the lens barrel are connected to an electrical device outside the lens barrel via one FPC, the number of electrical lines in the wiring pattern on the FPC becomes extremely high, requiring the width of the FPC to be increased proportionately. If the width of the FPC is increased, it becomes necessary to warp the FPC in the direction of its width around the optical axis to conform to the curvature of the cylindrical body of the lens barrel, when the FPC is to be extended parallel with the optical axis within the small space available in the lens barrel. However, if the FPC is warped around the optical axis, it becomes difficult to bend it in the longitudinal direction, and this makes it difficult to reduce the efficiency in assembly. Moreover, an excessive load is applied to the FPC when the lens groups move, which may cause a disconnection in the wiring pattern.

To deal with this problem, the technology in which a plurality of electrical devices within the lens barrel are connected to an electrical device outside the lens barrel using two or more FPCs is known (p81–p83, Shashin Kogyo (Photographic Industries), September 1990, published by Shashin Kogyo Shuppan). However, what is disclosed in this literature has some of the FPCs being led out to the outside of the lens barrel through the front end portion of the lens barrel and the rest of the FPCs being led out to the outside of the lens barrel through the rear end portion of the lens barrel. This means that space for leading the FPCs out must be procured at both ends of the lens barrel, and therefore, that the lens barrel must become larger.

SUMMARY OF THE INVENTION

The object of the present invention is to provide a lens barrel in which efficiency of assembly can be improved upon, without making the lens barrel larger or causing an excessive load to be applied to the lenses, by improving the arrangement of the flexible printed circuit boards.

In order to achieve the object described above, the lens barrel according to the present invention is provided with a lens group which can move against a camera main body, an electrical device which can move with the lens group, and a plurality of flexible printed circuit boards (FPCs), on one surface of each of which, a conductive pattern is formed and which are arranged one on top of the other, in order to electrically connect the electrical device to an electrical device which is provided outside of the lens barrel.

Since a plurality of FPCs are provided in the space within the lens barrel and arranged one on top of the other, the width of each FPC can be minimized and it is not necessary to warp the FPCs in the direction of their width, around the optical axis. Consequently, the FPCs can be easily bent in the longitudinal direction, achieving an improvement in assembly efficiency and also preventing any excessive load from being applied while the lens groups move. Also, by providing the FPCs one on top of the other, the limited space within the lens barrel can be effectively utilized and, at the same time, the FPCs can be led out to the outside of the lens barrel at one point. It is, therefore, not necessary to provide a space for leading them out at both the front and rear of the lens barrel, thus achieving a more compact lens barrel.

DETAILED DESCRIPTION OF THE PREFERRED EMBODIMENTS

First Embodiment

The first embodiment according to the present invention is explained in reference to FIGS. 1–6.

Figure 1:
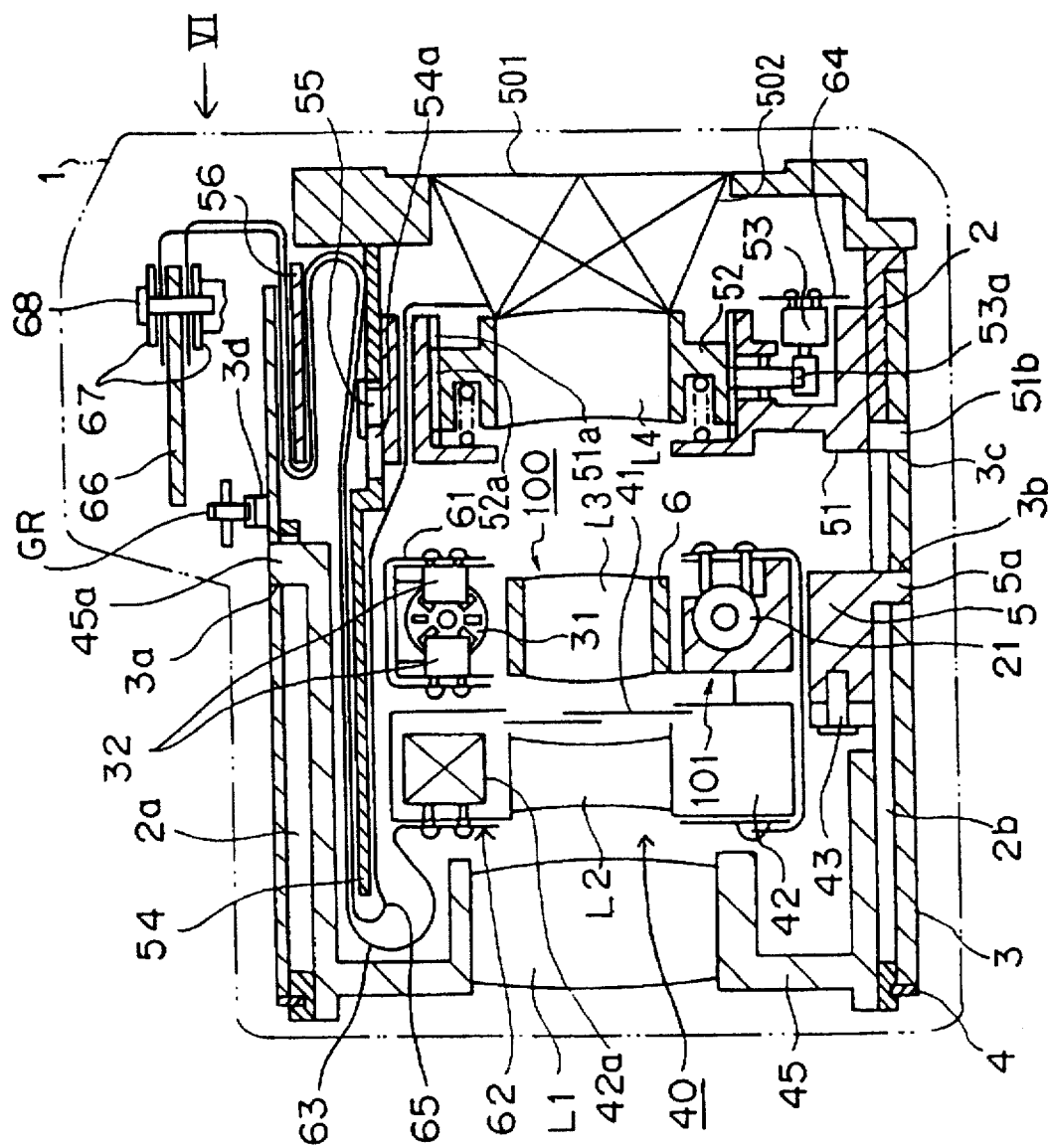
FIG. 1 is a cross section of a camera provided with a lens barrel in the first embodiment according to the present invention with the lens barrel at the wide angle position.
Figure 2:
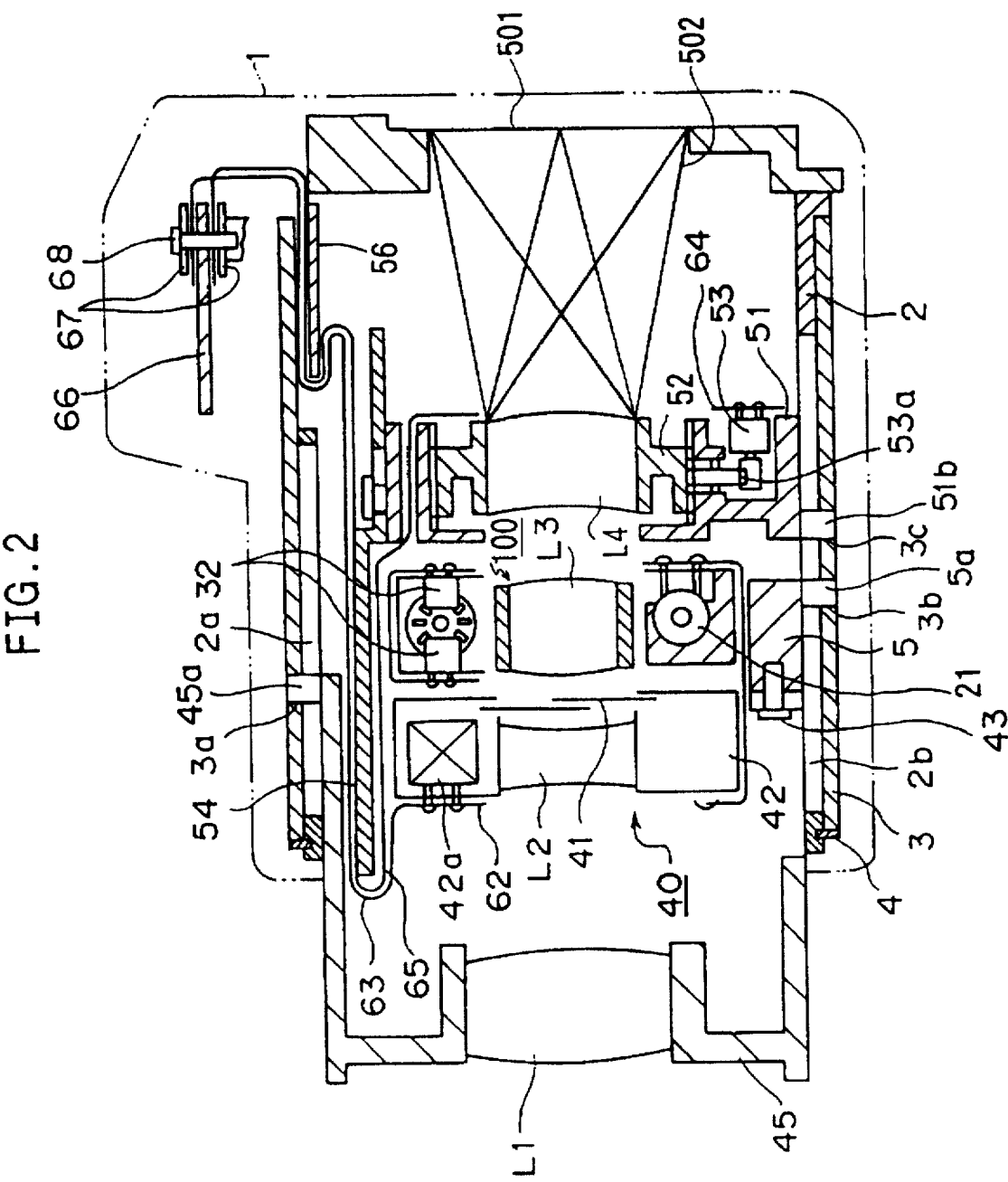
FIG. 2 is a cross section similar to that in FIG. 1, with the lens barrel at the telescopic position.

FIGS. 1 and 2 are side view cross sections showing a camera (zoom camera) with an integrated lens barrel. FIG. 1 shows the state of the camera when the lens barrel is at the wide angle position, while FIG. 2 shows the state of the camera when the lens barrel is at the telescopic position.

Reference number 2 indicates a fixed lens barrel secured to the camera main body 1 and rectilinear grooves 2a, 2b are formed in the direction of the optical axis on the circumferential surface of the fixed barrel 2 which construct a outside barrel of the lens barrel. The cam cylinder 3 is provided on the external circumferential surface of the fixed barrel 2 in such a manner that it can rotate, and the ring 4 prevents the cam cylinder 3 from coming off. The rotation of the zoom motor 77 (FIG. 5) is communicated to the gear unit 3d, which is formed on the external circumferential surface of the cam cylinder 3, via the gear GR and this rotates the cam cylinder 3. The cam grooves 3a, 3b and 3c are formed on the circumferential surface of the cam cylinder 3.

Figure 3:
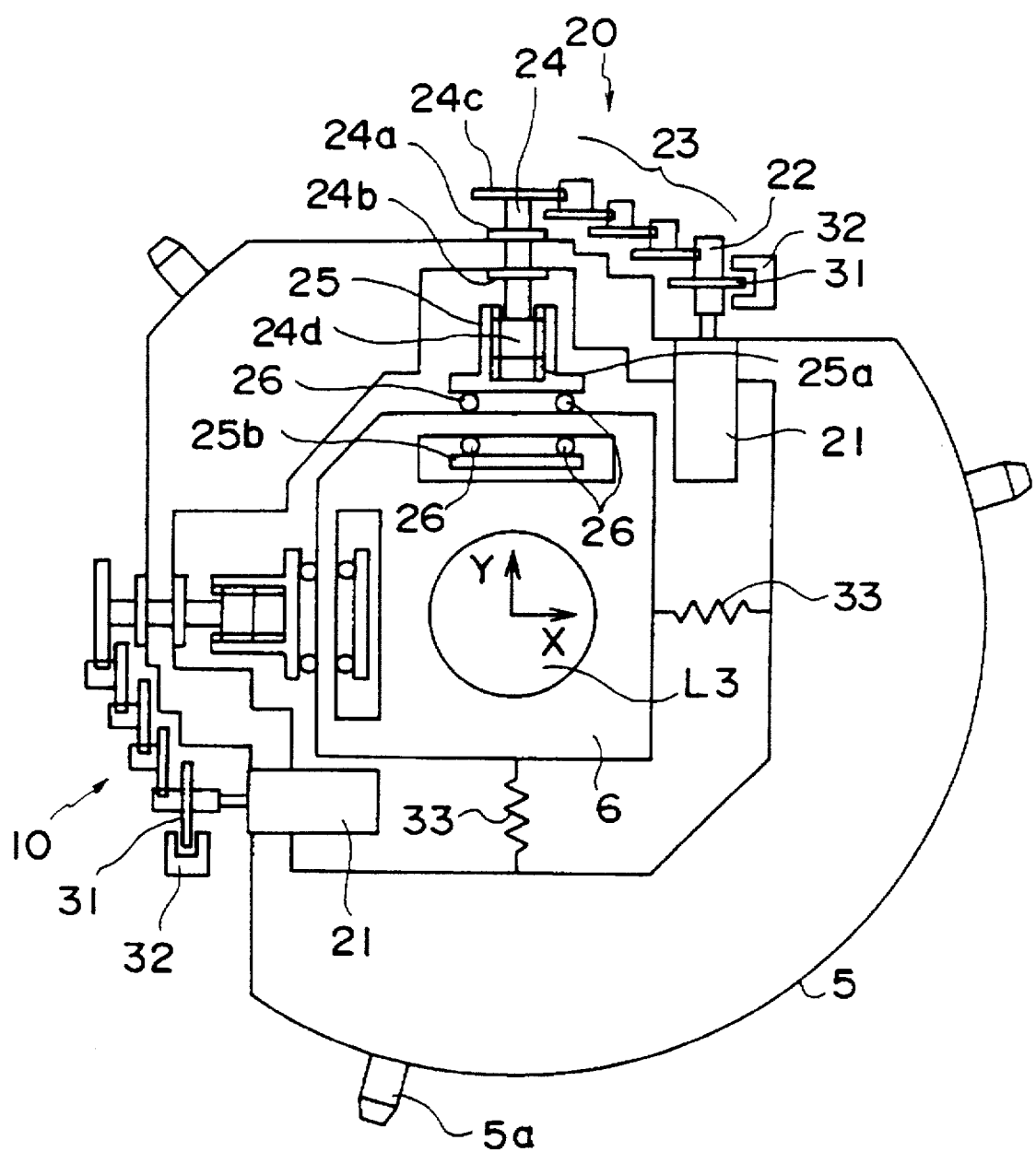
FIG. 3 shows details of a blur prevention device.

The lens base 5 is inserted on the side of the internal circumferential surface of the fixed barrel 2 and the blur prevention device 100 is held in the lens base 5. The blur prevention device 100 comprises the blur prevention lens L3 for preventing the blur of the photographic image caused by camera vibration, which is held by the lens holder 6 and the drive mechanism 101 which drives the blur prevention lens L3. The drive mechanism 101 consists of, as shown in FIG. 3, the X direction drive mechanism 10 which drives the blur prevention lens L3 in direction X and the Y direction drive mechanism 20 which drives it in direction Y. Directions X and Y are both at a right angle to the optical axis of the photographic lens.

The Y direction drive mechanism 20 is provided with the Y direction motor 21, the gear 22 which rotates in unison with the output shaft of the motor 21, the speed reducing gear train 23 which reduces the rotation speed imparted by the gear 22, the Y direction shift drive shaft 24 which is linked with the gear train 23 and the Y direction drive arm 25 which converts the rotation of the drive shaft 24 into linear movement. The Y direction shift drive shaft 24 is supported by the base 5 with a pair of flanges 24a, 24b in such a manner that it can rotate. The gear 24c, which interlocks with the last gear of the speed reducing gear train 23, is fitted on the upper portion of the Y direction shift drive shaft 24, and a male threaded portion 24d is formed at the lower portion of the Y direction shift drive shaft 24. The Y direction drive arm 25 is held in the space which is formed in the base 5 in such a manner that it can be lowered and elevated and, at the same time, it cannot rotate. The male threaded portion 24d of the drive shaft 24 is fitted into the female threaded portion 25a that is formed at the upper portion of the drive arm 25.

A clamping member 25b is formed at the lower end of the drive arm 25 and the upper linking portion of the lens holder 6 is clamped by the clamping member 25b via the four slider balls 26. As a result, when the drive arm 25 is raised or lowered, the lens holder 6 and, therefore, the blur prevention lens L3 are shifted in direction Y in the figure. The shift quantity is determined by the quantity of rotation of the motor 21. The X direction drive mechanism 10 has an identical structure to that of the Y direction drive mechanism 20, in which the blur prevention lens L3 shifts in direction X.

A disk 31, in which a plurality of holes are punched radially, is mounted to the gear 22, which rotates in unison with the output shaft of the Y direction motor, in such a manner that it also rotates in unison. Reference number 32 indicates a photo interrupter of the known art, which is provided with a light source portion and a light sensing portion which face each other across the area of the disk 31 in which the holes are formed so that every time the photo interrupter 32 detects a hole in the disk 31, a pulse signal is output. By counting the number of pulses, the rotation rate of the motor (determined by the shift quantity of the blur prevention lens L3) is detected. An identical set of disk and photo interrupter is provided on the X direction motor side, and with these, the rotation rate of the motor is detected.

In FIG. 3, one photo interrupter is shown for each of the directions X and Y. In fact, however, two photo interrupters 32 are provided for each direction, as shown in FIG. 1. Two photo interrupters are used in this manner in order to detect the direction in which the blur prevention lens L3 moves as well as its movement quantity. Reference number 33 in FIG. 3 indicates springs which apply a force to the lens holder 6 toward the Y direction drive mechanism 20 and toward the X direction drive mechanism 10.

In FIG. 1, a lens shutter mechanism 40 is mounted as an integrated part of the blur prevention device 100 as described above. The lens shutter mechanism 40 is constituted by integrating a shutter blade 41, which also functions as an aperture, and the drive unit 42, which drives the shutter blade 41. The drive unit 42 is mounted onto the base 5 with the screw 43. An electrical device 42a, which may be a motor for driving the shutter blade 41, is mounted on the drive unit 42. The lens group L2 is held on the internal circumferential surface of the drive unit 42. The cam follower 5a, which projects out from the base 5, is connected with the cam groove 3b of the cam cylinder 3 by passing through the rectilinear groove 2b of the fixed barrel 2. The lens holder 45, which holds the lens group L1, is inserted on the front end of the fixed barrel 2 and the cam follower 45a, which projects out from the external circumferential surface of the lens holder 45, is connected with the cam groove 3a of the cam cylinder 3 by passing through the rectilinear groove 2a of the fixed barrel 2.

The lens base 51 is inserted at the rear end of the fixed barrel 2. The helicoid 51a is formed on the internal circumferential surface of the lens base 51 and the cam follower 51b projects out from the external circumferential surface of the lens base 51. The cam follower 51b is connected with the cam groove 3c of the cam cylinder 3 by passing through the rectilinear groove 2b of the fixed barrel 2. Reference number 52 indicates a lens holder that holds the focusing lens L4. The helicoid 52a, which is formed on the external circumferential surface of the lens holder 52, is fitted by threading with the helicoid 51a in the lens base 51. The gear 53a, which is part of the output shaft of the focusing motor 53, is fitted by threading with the helicoid 51a, and the lens holder 52 is rotated with the rotation of the motor 53. When the lens holder 52 rotates, the helicoids 51a, 52a function to cause the lens holder 52 and, consequently, the focusing lens L4, to move in the direction of the optical axis, thereby performing focusing. The various lens groups L1–L4 described above constitute the photographic lens optical system. The reference numbers 501 and 502 indicate a film surface and a photographic optical path, respectively.

The FPC guide member, which is indicated by reference number 54, is extended in the direction of the optical axis between the blur prevention device 100 and the lens shutter mechanism 40, and the lens holder 45, and is held in the camera main body 1 in such a manner that it can slide in the direction of the optical axis. An elongated hole 54a, which runs in the direction of the optical axis is formed in the guide member 54, and the staged screw 55 that passes through the elongated hole 54a is fitted by threading with the lens base 51. Consequently, the lens base 51 moves in the direction of the optical axis, guided by the elongated hole 54a when performing zooming, which is to be explained later. When the staged screw 55 reaches the front end of the elongated hole 54a, the lens base 51 and the guide member 54 begin to move in unison. Reference number 56 indicates another FPC guide member, which is provided along the internal circumferential surface at the rear portion of the cam cylinder 3.

Reference number 61 indicates a flexible printed circuit board for blur prevention (hereafter referred to as the blur prevention FPC), which is approximately circular in shape and which is attached to the rear surface (right side surface in the figure) of the blur prevention device 100. The electrical devices (the X, Y direction motors 21 and the various photo interrupters 32) which constitute the blur prevention device 100 are mounted on this blur prevention FPC 61 by soldering. The lower portion of the blur prevention FPC 61 is led out to the front of the camera along the direction of the optical axis after passing through the hole provided in the lens base 5 and is connected to the mounting board 62, which is attached to the front surface (left side surface in the figure) of the shutter mechanism 40 by soldering. The electrical devices 42a inside the shutter drive unit 42 are connected to the mounting board 62 by soldering. One end of the flexible printed circuit board for the shutter (hereafter referred to as the shutter FPC) 63 for connecting these electrical devices 42a to the driver outside the lens barrel is also connected to the mounting board 62.

The circular mounting board 64 is attached to the rear surface (right side surface in the figure) of the lens base 51 that holds the focusing lens group L4 and the focusing motor 53 is connected to this board 64 by soldering. One end of the flexible printed circuit board for focusing (hereafter referred to as the focusing FPC) 65 for connecting the focusing motor 53 to the driver outside the lens barrel is also connected to the mounting board 64.

Figure 4:
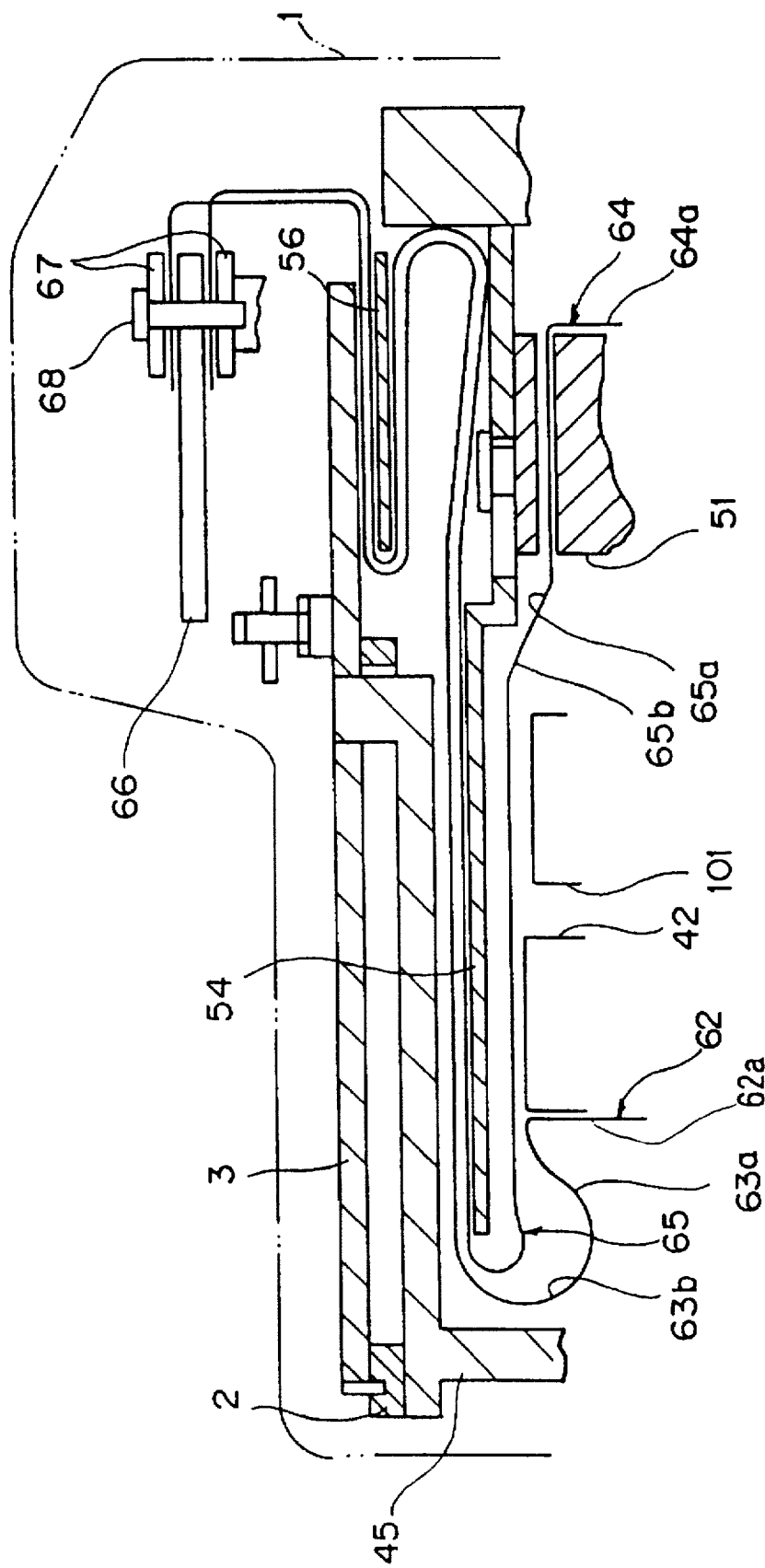
FIG. 4 is an enlargement of the essential part of FIG. 1.

As shown in the enlargement in FIG. 4, the focusing FPC 65 travels through the hole provided in the lens base 51 to be led out to the front of the base 51, and then travels through the space between the blur prevention device 100 and the lens shutter mechanism 40, and the FPC guide member 54, to be led out toward the front of the camera. There, at the front end of the FPC guide member 54, the focusing FPC 65 is bent backwards while still in the relationship with the shutter FPC 63 that one is on top of the other.

On one surface of each of the FPCs 63, 65, a conductive pattern is formed and the FPCs 63, 65 are connected to the mounting boards 62, 64 respectively in such a manner that the surfaces on which these conductive patterns are formed (cover lay surfaces) 63a, 65a face the same direction as the soldered surfaces of the mounting boards 62, 64 respectively, that is, the left side surface 62a in the case of the mounting board 62 and the right side surface 64a in the case of the mounting board 64. Consequently, these FPCs 63, 65 are place one on top of the other in such a manner that their rear surfaces (the surfaces on which conductive patters are not formed, hereafter referred to as base surfaces) 63b, 65b face opposite each other.

The FPCs 63, 65, which are now bent toward the rear of the camera, are then led through toward the rear of the camera via the space between the FPC guide member 54 and the lens base 45 while maintaining the relationship in which one is on top of the other. Then they are bent again toward the front of the camera. Next, after being bent backwards again at the front end of the FPC guide member 56, the FPCs 63, 65 travel through the space between the FPC guide member 56 and the cam cylinder 3 to be led out to the outside of the lens barrel. The front ends of the FPCs 63, 65 are then led to the upper portion of the camera main body 1.

Figure 5:
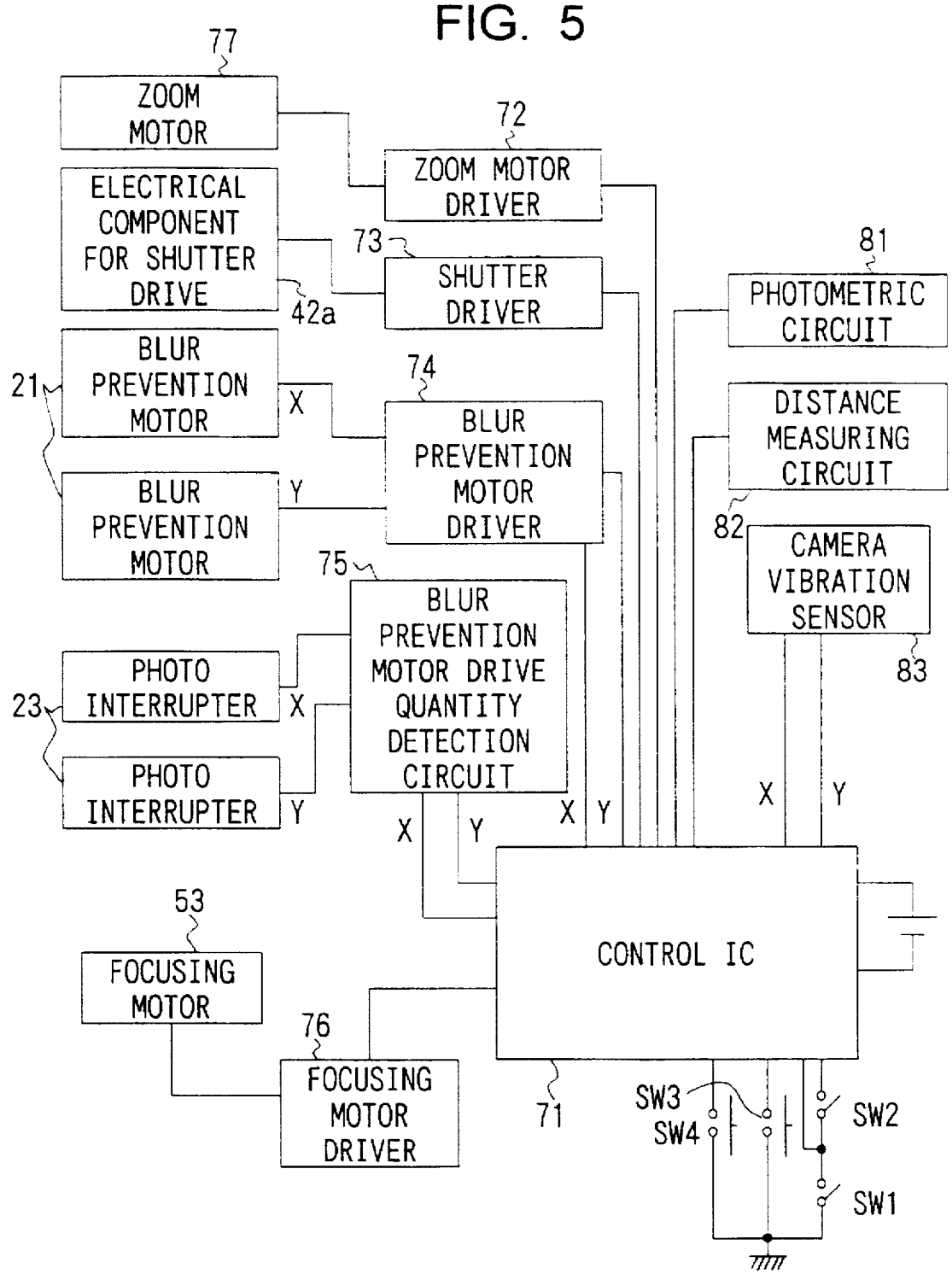
FIG. 5 is a block diagram showing the control system of the camera in FIG. 1.

On the board 66, which is secured at the upper portion of the camera body 1, there are mounted the zoom driver 72, the shutter driver 73, the blur prevention motor driver 74, the blur prevention motor drive quantity detection circuit 75 and the focusing motor driver 76, which, as shown in FIG. 5, are all connected to the control IC 71. The control IC 71 is also mounted on the board 66. The zoom motor 77 is connected to the zoom driver 72.

Figure 6:
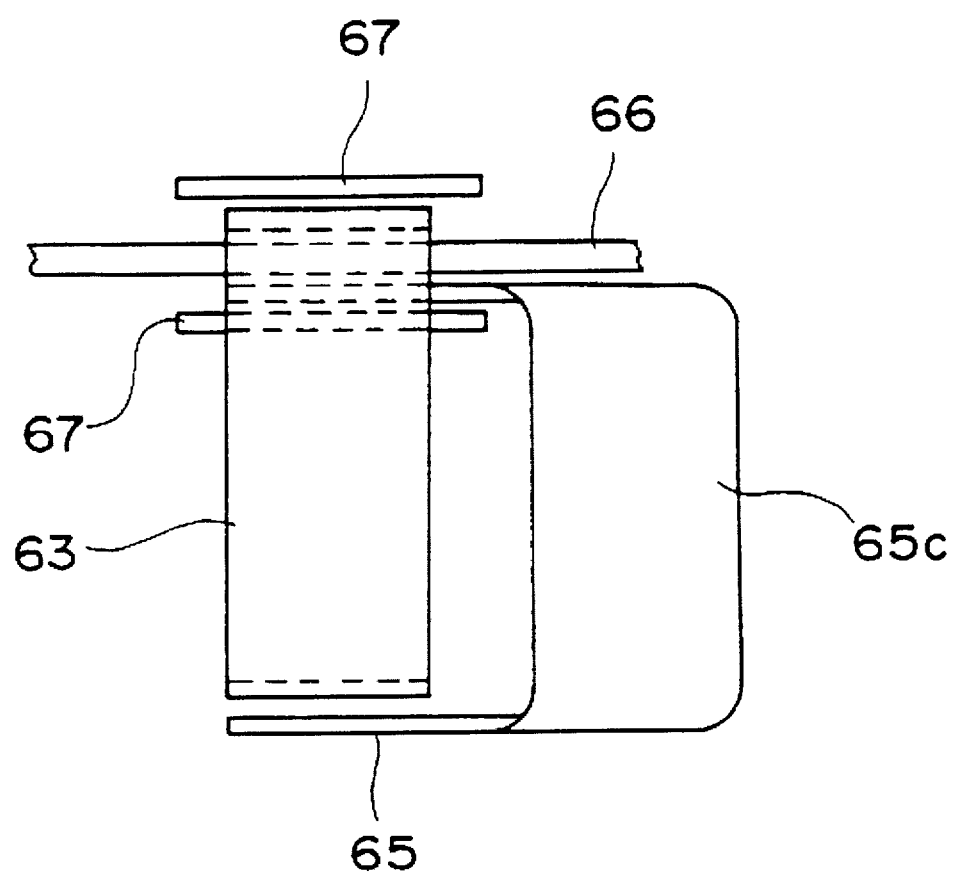
FIG. 6 shows the camera in FIG. 1 viewed from the direction VI.

The front end of the FPC 63 which is led out to the outside of the lens barrel is bent twice as shown in FIG. 4, to be led to the upper surface of the board 66. While the switchback portion 65c, as shown in FIG. 6, is provided in advance at the front end of the FPC 65 and by using this switchback portion 65c, the front end of the FPC 65 is led out to the front of the vertical portion of the FPC 63 to be led to the lower surface of the board 66. Then the front ends of the FPCs 63, 65 are pressure connected to the upper and lower surfaces respectively of the board 66 via a pair of hold-down plates 67 and one mounting screw 68.

In FIG. 5, a photometric circuit 81, a distance measuring circuit 82 and a camera vibration sensor 83 that detects the quantity of camera vibration caused by hand motion, all of the known art, are also connected to the control IC 71. The electrical device 42a for shutter drive is connected to the shutter driver 73 via the mounting board 62 described above and the shutter FPC 63. The X and Y direction motors 21 and the X and Y direction photo interrupters 32 are connected to the blur prevention motor driver 74 and to the blur prevention motor drive quantity detection circuit 75 respectively via the blur prevention FPC 61, the mounting board 62 and the shutter FPC 63. The blur prevention motor drive quantity detection circuit 75 detects the drive quantities and drive directions of the X and Y direction motors 21 based upon the output from the photo interrupters 32. In other words, it detects the distance that the blur prevention lens L3 travels and also the direction in which it moves. The blur prevention motor drive quantity detection circuit 75 then inputs this information to the control IC 71. The focusing motor 53 is connected to the focusing motor driver 76 via the mounting board 64 and the focusing FPC 65.

In addition, the first position switch SW1, which is turned on when the release button is pressed half way down, the second position switch SW2 which is turned on when the release button is pressed all the way down, as well as the zoom switches SW3 and SW4, are connected to the control IC71.

The control IC71 starts operating the photometric circuit 81 and the distance measuring circuit 82 when the first position switch SW1 is turned on. At the same time, it drives the focusing motor 53 based upon the detection output of the distance measuring circuit 82. As the focusing motor 53 is driven, the focusing lens L4 is driven in the direction of the optical axis to implement focusing. The control IC71 also controls the electrical device 42a for shutter drive based upon the output from the photometric circuit 81 when the release switch SW2 is turned on. This results in the opening and closing of the shutter blade 41. During a shutter release, the control IC71 drives and controls the X and Y direction motors 21 based upon the output from the camera vibration sensor 83 and the output from the blur prevention motor drive quantity detection circuit 75, and moves the blur prevention lens L3 in the direction that runs at a right angle to the optical axis for an appropriate distance. With this, image blurring caused by camera vibration is prevented.

In addition, when the zoom switches SW3, SW4 are turned on, the control IC71 drives the zoom motor 77 via the zoom motor driver 72. This causes the cam cylinder 3 to rotate via the gear GR and the various cam grooves 3a, 3b and 3c move along with the rotation of the cam cylinder 3. Thus, the lens holder 45 and the lens bases 5, 51 are all driven in the direction of the optical axis via the cam followers 45a, 5a and 53a respectively. As a result, the various lens groups L1–L4 are driven between the wide angle position shown in FIG. 1 and the telescopic position shown in FIG. 2, that is, zooming is performed. As the FPCs 63, 65 are appropriately deformed, as shown in the figures, when this zooming occurs, an excessive load is not applied to the lens groups L1–L4. Further, FPC 63 and 65 are not inserted into the photographic optical path regardless of the zooming position of the photographic lens, and therefore, FPC 63 and 65 have no influence on the photographic image.

As has been explained, in this embodiment, since the FPC 63 for connecting the various electrical devices which constitute the shutter mechanism 40 and the blur prevention device 100 to an electrical device outside the lens barrel, and the FPC 65 for connecting the focusing motor 53 to an electrical device outside the lens barrel are provided separately, the width of each of the FPCs 63, 65 can be minimized. This eliminates the necessity to warp the FPCs in the direction of their width around the optical axis and they can, therefore, be bent easily in the longitudinal direction, achieving an improvement in ease of assembly. Generally speaking, FPCs are extremely thin and therefore, even when two FPC 63, 65 are placed one on top of the other, as described above, their combined thickness does not become a problem. As a result, the installation space can be kept to a minimum. In addition, by placing the FPCs 63, 65 one on top of the other, both FPCs 63, 65 can be led out to the outside of the lens barrel at the same place. This eliminates the necessity to provide egress points for leading FPCs out at the front and rear of the lens barrel, achieving a more compact lens barrel.

Particularly, in this embodiment, the two FPCs 63, 65 are arranged one on top of the other in such a manner that the base surfaces of the FPCs 63, 65 face opposite each other. Thus, the front ends of the FPCs 63, 65, which are led out to the outside of the lens barrel, can be pressure connected to the upper and lower surfaces of the board 66 with a single screw 68 without twisting the FPCs 63, 65, further improving the efficiency in assembly work.

Second embodiment

The second embodiment according to the present invention is explained in reference to FIGS. 7–10.

In the second embodiment, the structure of the first embodiment is partially modified and the following is an explanation of the changes.

Figure 7:
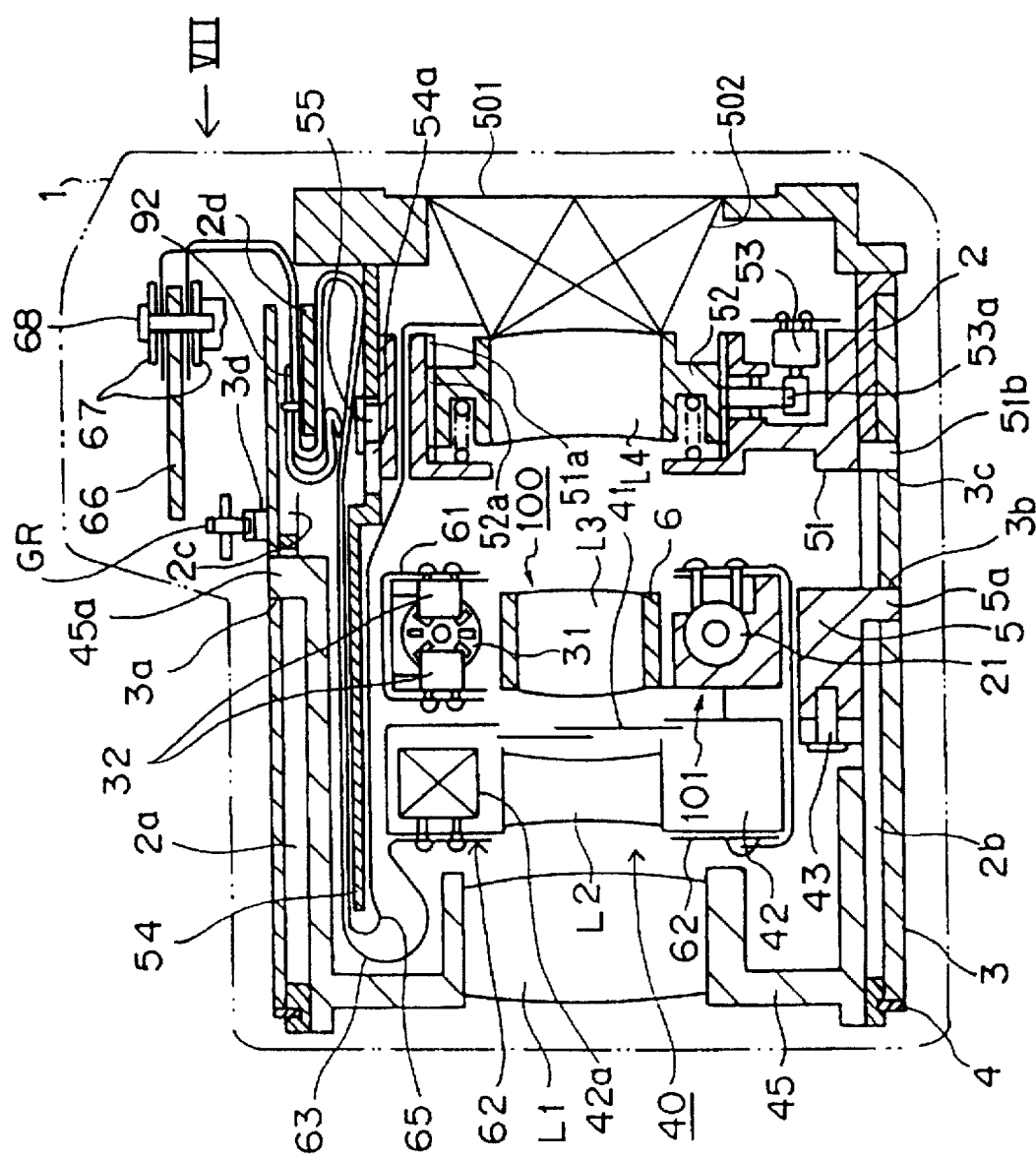
FIG. 7 is a cross section of a camera provided with the lens barrel in the second embodiment according to the present invention.

As shown in FIG. 7, the FPCs 63, 65, which are bent toward the rear of the camera at the front end of the FPC guide member 54, are then led through toward the rear of the camera via the space between the FPC guide member 54 and the lens base 45 while maintaining the relationship in which one is on top of the other so that their rear surfaces face opposite each other. Then, they are bent again toward the front of the camera in the vicinity of the rear end of the lens barrel. Next, they are bent toward the rear again, along the guide fixing portion 2d of the fixed barrel 2.

Figure 8:
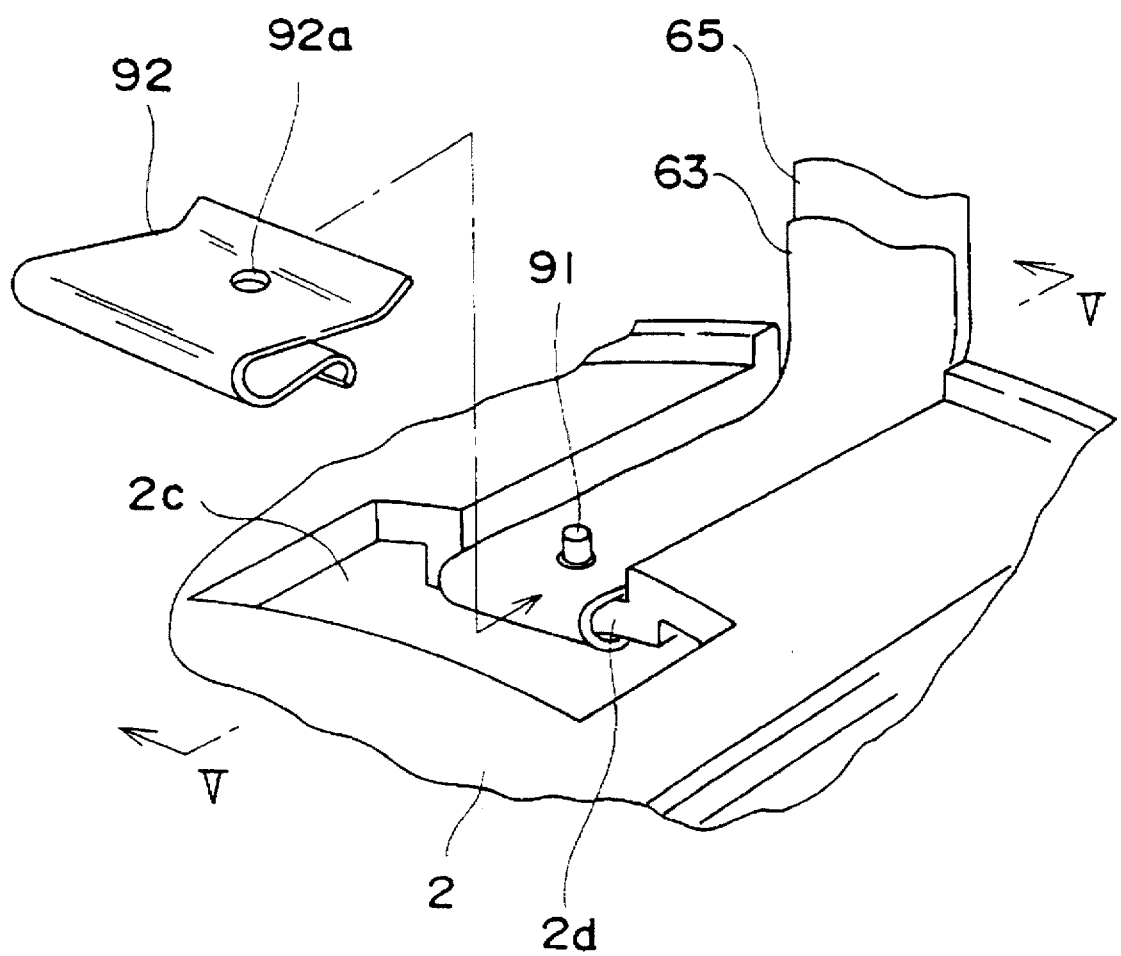
FIG. 8 is a partial enlargement of the lens barrel in FIG. 7.
Figure 9:
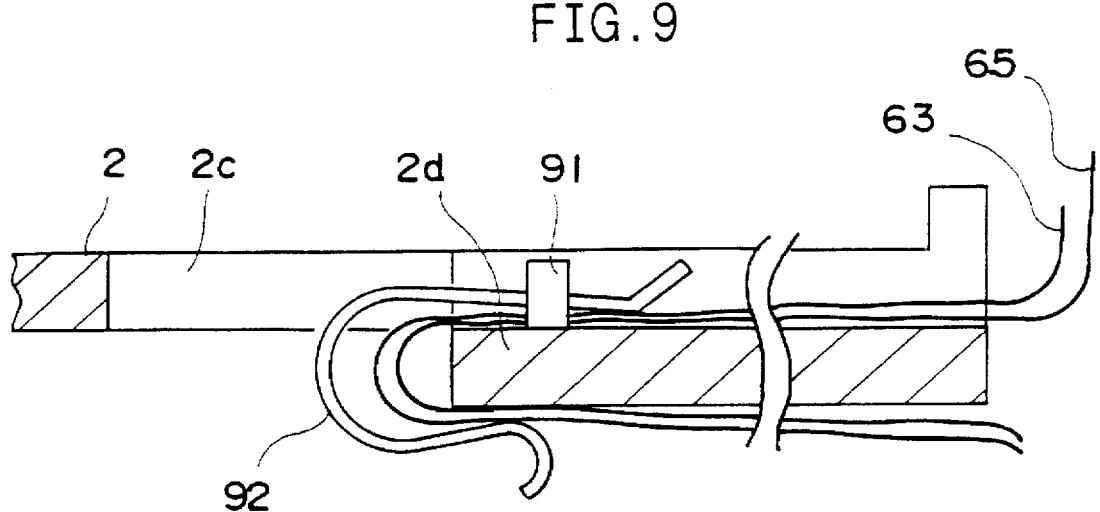
FIG. 9 is a cross section of the lens barrel shown in FIG. 8 through line V—V, with the lens barrel at the wide angle position.
Figure 10:
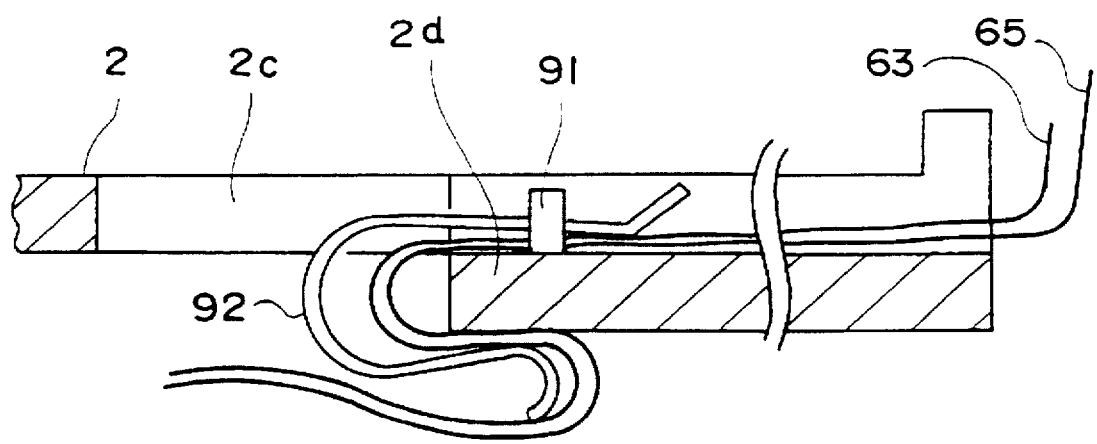
FIG. 10 is a cross section of the lens barrel shown in FIG. 8 through line V—V, with the lens barrel at the telescopic position.

To be precise, as shown in FIGS. 8–10, a rectangular hole 2c is formed in the circumferential surface of the fixed barrel 2 at the rear end, and also the FPC guide fixing portion 2d is formed to end flush with the rear edge of the hole 2c toward the rear end of the fixed barrel 2. On the upper surface of the guide fixing portion 2d, a pin 91 projects upward. The FPCs 63, 65, which are extended forward along the internal circumferential surface of the fixed barrel 2, then pass through the hole 2c bending around the end surface of the guide fixing portion 2d and are extended backwards to be led out over the external circumferential surface of the fixed barrel 2. At this point, the pin 91 is inserted though holes that are bored in the FPCs 63, 65 in advance. Reference number 92 indicates a clip which is provided with a hole 92a and which secures the FPCs. With this clip 92, the bent portions of the FPCs 63, 65 are clamped from above and below, as shown in FIG. 9, lens barrel in the first embodiment according to the to be secured in the guide fixing portion 2d. At this time, the hole 92a of the clip 92 fits onto with the pin 91.

After that, the FPCs 63, 65 pass through the gap between the guide fixing portion 2d and the cam cylinder 3 to be led out to the outside of the lens barrel as shown in FIG. 7, and their front ends are led to the upper portion of the camera main body 1. Then, the front ends of the FPCs 63, 65 are pressure connected to the upper and lower surfaces of the board 66, on which the control IC71 and the like are mounted, with a pair of hold down plates 67 and one mounting screw 68, just as in the first embodiment.

As has been explained, in this embodiment, since the FPCs 63, 65, which are arranged one on top of the other, are bent around the guide fixing portion 2d of the fixed barrel 2 and the bent portions are clamped and secured at the guide fixing portion 2d with the clip 92, an excessive load is not applied to the connecting portions at the two ends of the FPCs 63, 65 which would otherwise be caused by the FPCs 63, 65 being pulled when the lens groups move. Also, since a plurality of FPCs can be secured at once by mounting just the one clip 92, an improvement in efficiency of assembly is achieved. Particularly, in this embodiment, the FPCs 63, 65 and the hole portion of the clip 92 are connected with the pin 91 which is projected from the guide fixing portion 2d and this ensures that the FPCs 63, 65 and the clip 92 do not become misaligned and that the clip 92 does not become disengaged. Furthermore, since the guide fixing portion 2d is formed in the fixed barrel 2, which is provided with the rectilinear grooves 2a, 2b that guide the lens groups in the direction of the optical axis, it is not necessary to provide a special guide member, thus achieving an reduction in the number of components.

Note that when zooming of the photographic lens is performed, as shown in FIGS. 9 and 10, the FPCs 63, 65 deform as necessary so that an excessive load is not applied to the lens groups L1–L4.

In the second embodiment described above, the two FPCs 63, 65 are arranged one on top of the other. However, three or more FPCs that are integrated with three or more corresponding lens groups may be provided one on top of another. In that case, too, the area on the guide fixing portion 2d, which is required for securing the FPCs, can remain the same as for one FPC, and all the FPCs can be secured in the guide fixing portion 2d by mounting just one clip. Furthermore, the position of the guide fixing portion is not restricted to the rear end of the lens barrel. It may be provided at, for example, the front end of the lens barrel. Also, while an example in which the guide fixing portion is formed in the fixed barrel 2 is presented in the second embodiment, a separate guide fixing member may be provided. Also, the shape of the clip is not restricted to that used in the embodiment.

Third embodiment

Figure 11:
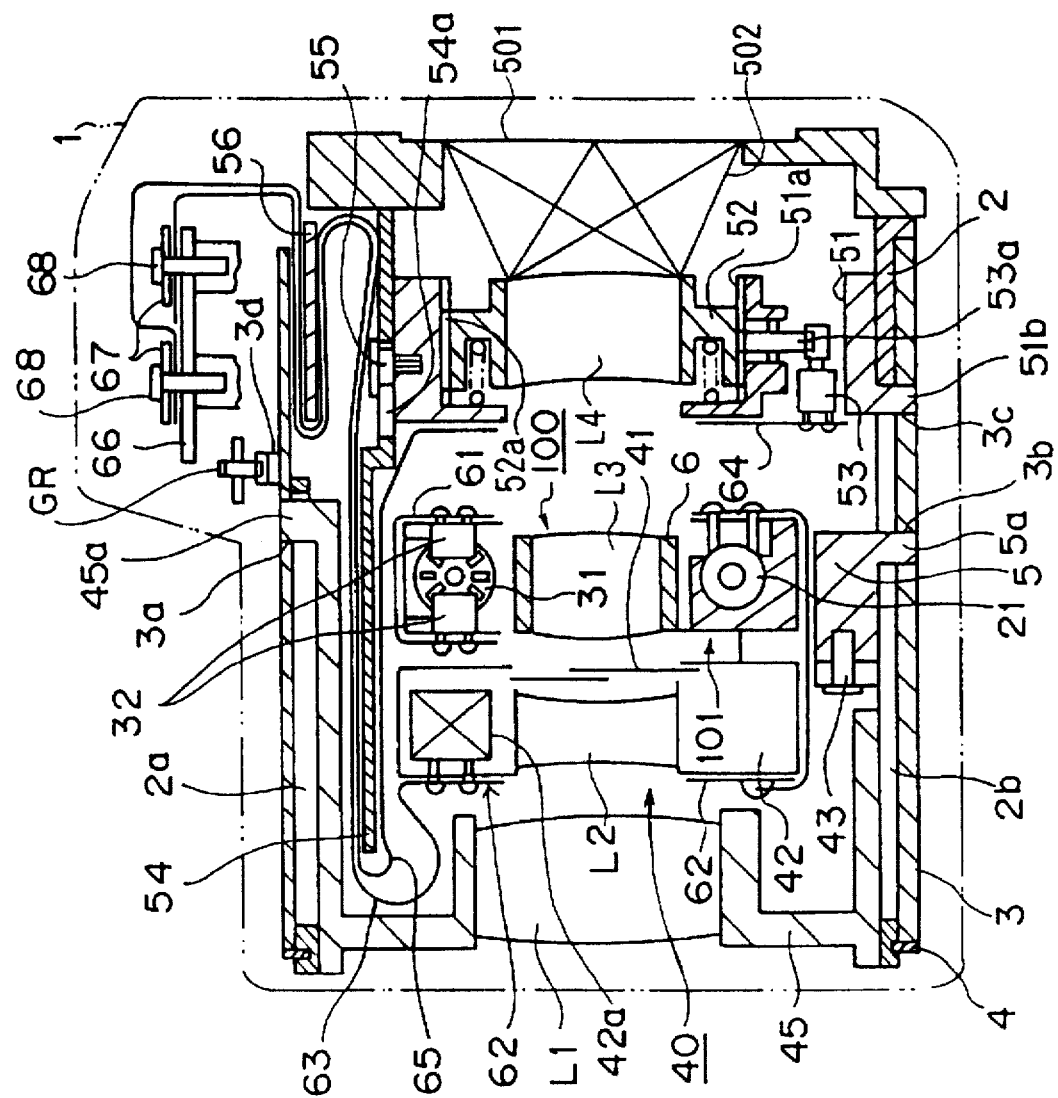
FIG. 11 is a cross section of a camera that is provided with the lens barrel in the third embodiment according to the present invention.
Figure 12:
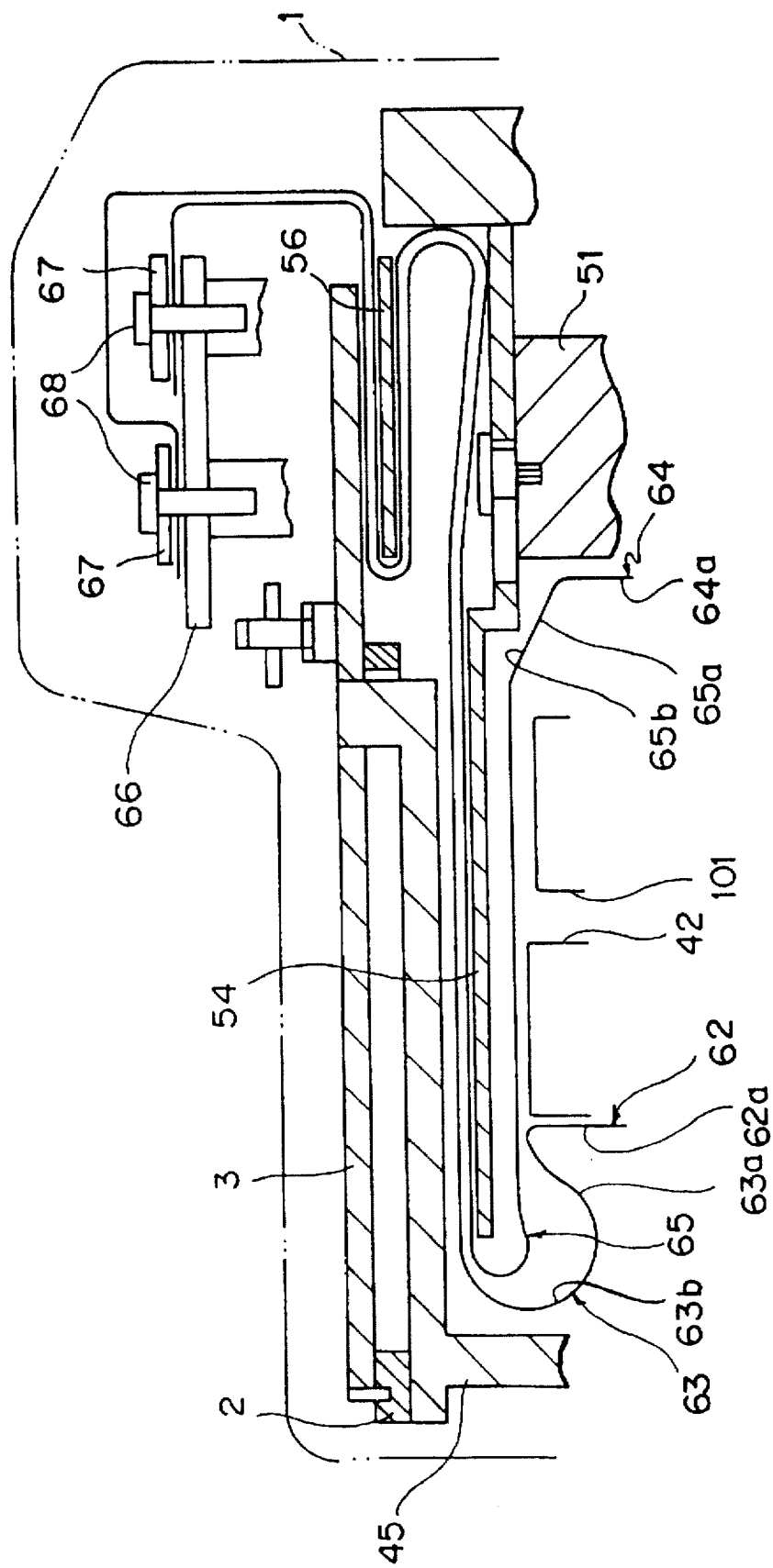
FIG. 12 is a cross section of a camera that is FIG. 11.

The third embodiment according to the present invention is explained in reference to FIGS. 11 and 12. Note that the same reference numbers are assigned to members identical to those shown in the figures used for the explanation of the first and second embodiments and that only the differences from those two embodiments are explained here.

In FIG. 11, a circular mounting board 64 is attached to the front surface of the lens base 51 (left side surface in the figure), which holds the focusing lens group L4. The focusing motor 53 is connected to the board 64 by soldering. Also, one end of the focusing FPC 65, for connecting the focusing motor 53 with a driver outside the lens barrel, is connected with the board 64. The focusing FPC 65, as shown in the enlargement in FIG. 12, passes through the space between the blur prevention device 100 and the lens shutter mechanism 40, and the FPC guide member 54, to be led out toward the front of the camera. Then it is bent backwards at the front end of the guide member 54, still in the relationship with the shutter FPC 63 in which they are arranged one on top of the other.

On one surface of each of the FPCs 63, 65, a conductive pattern is formed and the FPCs 63, 65 are connected to the mounting boards 62, 64 respectively in such a manner that the surfaces on which these conductive patterns are formed (cover lay surfaces) 63a, 65a face the same direction as the soldered surfaces 62a, 64a of the mounting boards 62, 64 respectively. Consequently, these FPCs 63, 65 are arranged one on top of the other in such a manner that the cover lay surface 65a of the FPC 65 and the rear surface of the FPC 63 (the surface on which a conductive pattern is not formed, hereafter referred to as the base surface) 63b, face opposite each other.

The FPCs 63, 65, which are bent toward the rear of the camera, pass through the space between the FPC guide member 54 and the lens base 45 while maintaining the relationship in which one is on top of the other and are then led back toward the rear of the camera. Then they are bent again toward the front of the camera. Next, after being bent backwards again at the front end of the FPC guide member 56, the FPCs 63, 65 travel through the space between the FPC guide member 56 and the cam cylinder 3 to be led out to the outside of the lens barrel, where their front ends are led up into the upper portion of the camera main body 1. Then the front ends of the FPCs 63, 65 are pressure connected to the board 66 via the hold-down plates 67 and the mounting screws 68. All other aspects of its structure are identical to those in the first embodiment.

In this embodiment too, since the two FPCs 63, 65 are provided separately, the widths of the FPCs 63, 65 can be minimized and even when the two FPCs 63, 65 are arranged one on top of the other as described above, their combined thickness does not present a problem. As a result, the installation space can be kept to a minimum. In addition, they can be led out to the outside of the lens barrel from the same point of egress. This eliminates the necessity to provide space for leading the FPCs out at both the front and rear ends of the lens barrel.

Particularly, in this embodiment, the two FPCs 63, 65 are arranged one on top of the other in such a manner that the base surface of the FPC 63, and the cover lay surface of the FPC 65 face opposite each other and, as a result, their front ends can be pressure connected to the same surface of the board 66 without crossing or twisting the FPCs 63, 65, which are led out to the outside of the lens barrel. This means that providing two FPCs does not detract from ease of assembly.

Also, with zooming of the photographic lens, the interval between the blur prevention drive mechanism 101 and the shutter drive mechanism 42, and the focusing mechanisms 52, 53, changes. However, since only the focusing motor 53 is connected to the FPC 65 described above, the form, at least, of the FPC 65 is simplified. At the same time, by integrating the blur prevention drive mechanism 101 and the shutter drive mechanism 42, the distance between the two mechanisms 101 and 42 does not change during zooming of the photographic lens. Consequently, the form of the FPC 63 for connecting the blur prevention motor 21 and the electrical device 42a, which are the sources for driving the two mechanisms 101, 42, to the control IC71, can be simplified as well.

Fourth embodiment

Figure 13:
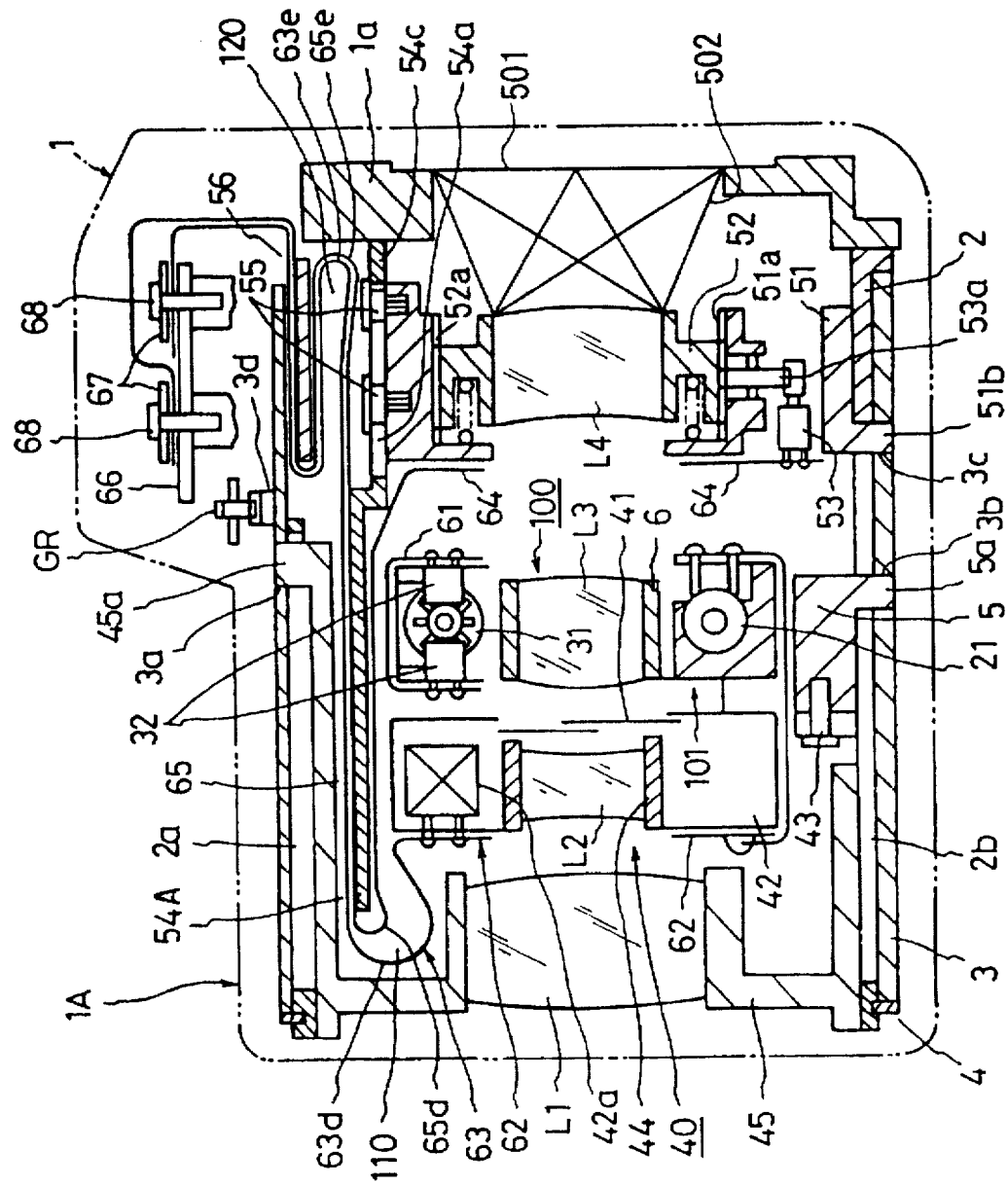
FIG. 13 is a cross section of a camera that is provided with the lens barrel in the fourth embodiment according to the present invention, with the lens barrel at the wide angle position.
Figure 14:
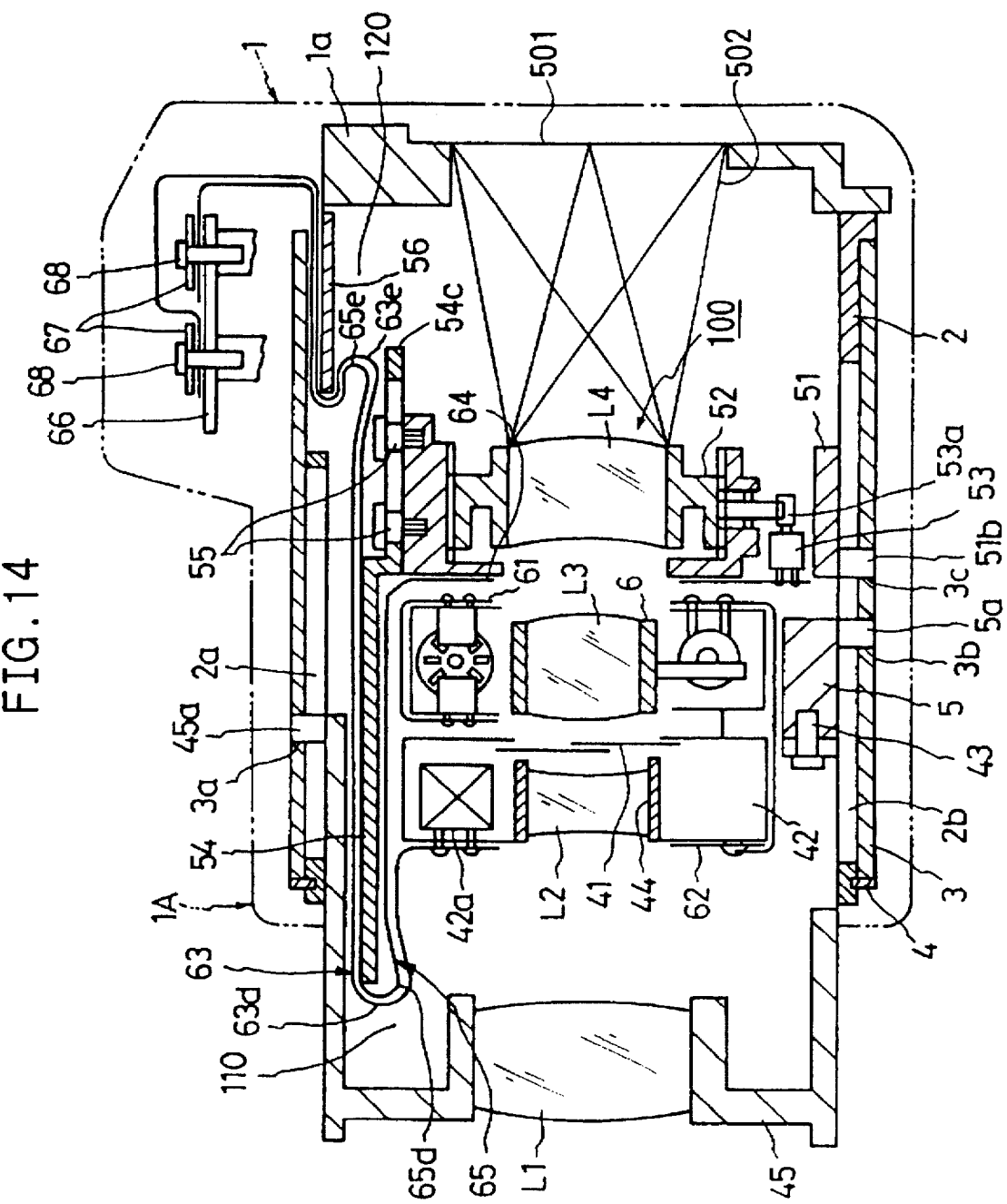
FIG. 14 is a cross section similar to that in FIG. 13, with the lens barrel at the telescopic position.
Figure 15:
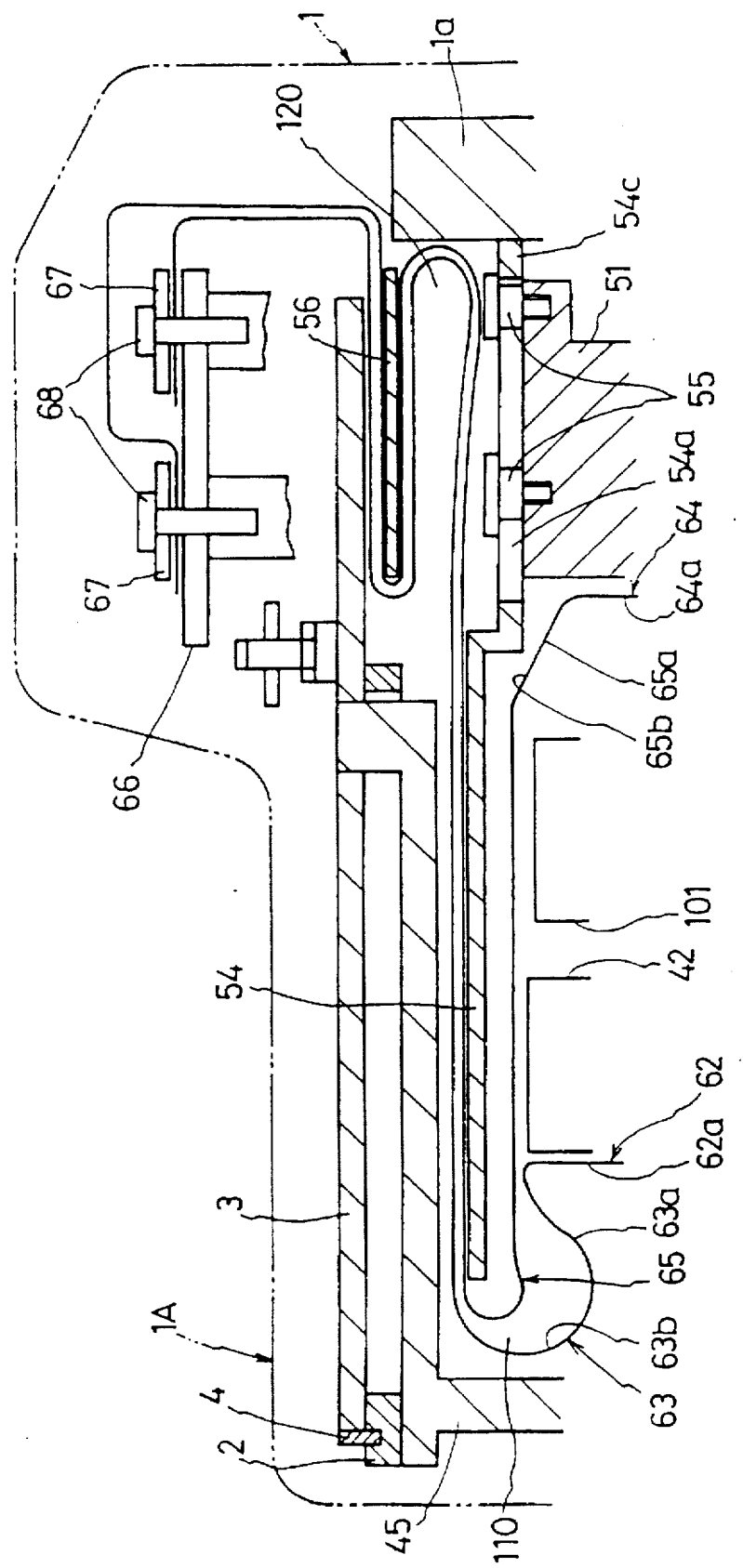
FIG. 15 is an enlargement of the essential part of FIG. 13.

The fourth embodiment according to the present invention is explained in reference to FIGS. 13–15.

This embodiment is similar in structure to the third embodiment except for partial modifications. The same reference numbers are assigned to members that are identical to those shown in the figures used in the explanation of the third embodiment and the differences from the third embodiment are explained here.

The FPC guide member, which is indicated by reference number 54A in FIG. 13, is extended in the direction of the optical axis between the blur prevention device 100 and the lens shutter mechanism 40, and the lens holder 45, and is held in the lens base 51 in such a manner that it can slide in the direction of the optical axis. An elongated hole 54a, which runs in the direction of the optical axis is formed in the guide member 54A, and a pair of staged screws 55 that pass through the elongated hole 54a are fitted by threading into the lens base 51. The pair of staged screws are provided in the direction of the optical axis within the elongated hole 54a in order to steer the guide member 54A smoothly and reliably along the direction of the optical axis. During zooming, to be explained later, the lens base 51 moves in the direction of the optical axis along the elongated hole 54a and when one of the staged screws reaches the front end of the elongated hole 54a, the lens base 51 and the guide member 54A begin to move in unison.

The operation performed in zooming of the lens barrel is explained below.

During zooming, the following two different cases are conceivable: (a), in which the guide member 54A and the lens base 51 move in unison from the beginning, because of the friction of the guide member 54A and the lens base 54 or the staged screws 55, and (b), in which only the lens base 51 moves while the guide member 54A remains stationary due to the holding force of the FPCs 63, 65.

In case (a), when the lens barrel is zoomed out from the telescopic position shown in FIG. 4 to a certain state, for example, the rear end of the guide member 54A comes into contact with the fixed member 1a within the camera main body 1 and the movement of the guide member 54A is limited. At this time, the bent portions 63e, 65e of the FPCs 63, 65 at the rear end of the lens barrel are positioned so as to occupy the entirety of the FPC housing space 120 at the rear end of the lens barrel. When the lens barrel is further zoomed out, the staged screws 55, which are secured in the lens base 51, move backwards along the elongated hole 54a of the guide member 54A, and the lens barrel enters the wide angle state shown in FIG. 13. At this point, the bent portions 63d, 65d of the FPCs 63, 65 at the front end of the lens barrel are in the lax state within the FPC housing space 110 at the front end of the lens barrel and are positioned so as to occupy the entirety of the FPC housing space 110.

In case (b), the guide member 54A does not move even when the lens base 51 starts to move backward. Then, only when the staged screws 55 come into contact with the rear end of the elongated hole 54a of the guide member 54A, does the guide member 54A start to move in unison with the lens base 51. In case (a), first the bent portions 63e, 65e at the rear end of the lens barrel are housed in the FPC housing space 120, then the bent portions 63d, 65d at the front end of the lens barrel are housed in the FPC housing space 110. This is not so in case (b).

Next, the operation at the time of zooming in is explained.

When the lens barrel is in the wide angle state, as shown in FIG. 13, the rear end of the guide member 54A is in contact with or in close proximity with the fixed member 1a of the main body 1. At this time, in the first and second FPC housing spaces 110, 120, the FPCs 63, 65 are housed in the lax state. When zooming in is performed in this state, the lens base 51 moves in the direction of the optical axis as explained earlier, and either the staged screws 55 come in contact with the front end of the elongated hole 54a or, because of the friction between the lens base 51 and the guide member 54A, these members move in unison. If the lens barrel is further zoomed in, it reaches the telescopic position shown in FIG. 14.

At this point, the FPCs 63, 65 are housed in the FPC housing spaces 110, 120 in state in which they are stretched out almost as far as they go. However, in this state, the front end of the elongated hole 54a and the staged screws 55 are not necessarily in contact. In other words, since there is a degree of allowance for the staged screws 55 in the direction of the length of the elongated hole 54a, the guide member 54 is held at an appropriate position due to the balance between the bending strength of the bent portions 63d, 65d; 63e, 65e during the operation, or due to the balance of friction between the lens base 51 and the guide member 54A or the like. Then, as the lens barrel approaches the wide angle position, the bent portions 63d, 65d; 63e and 65e are housed in the FPC housing spaces 110 and 120 respectively at approximately the same time.

As has been explained in this embodiment, the FPC guide member 54A can move relative to the lens group L4 in the direction of the optical axis and the bent portions of the FPCs 63, 65 are provided in the vicinities of the two ends of the guide member 54A. This structure allows the FPCs to be installed in the state required during assembly with the length of the guide member 54A at the absolute minimum necessary, regardless of the movement itself or the movement quantity of the various lens groups within the lens barrel. The length of the FPCs 63, 65 themselves can be shortened. As a result, only a minimal amount of space is required for housing the FPCs, achieving an effective utilization of space within the lens barrel.

Note that in the first through third embodiments explained earlier and also in the fifth embodiment to be explained later, too, the FPC guide member can move in the direction of the optical axis and these embodiments also achieve similar advantages to those achieved in this embodiment.

The fourth embodiment, which has been explained so far, is structured in such a manner that the FPC guide member can be moved in the direction of the optical axis by the mechanism comprising the staged screws 55 and the elongated hole 54a. However, this moving mechanism for the FPC guide member may take a different structure. Also, the movement of the guide member 54 is stopped by having the guide member come into contact with the fixed portion 1a of the main body 1. However, if, for example, a raised portion is provided in the fixed barrel 2 to be used as a stopper for the guide member 54, the length of the guide member 54 in the direction of the optical axis can be further reduced. In addition, the position of the guide member is not restricted to that in this embodiment.

Fifth embodiment

Figure 16:
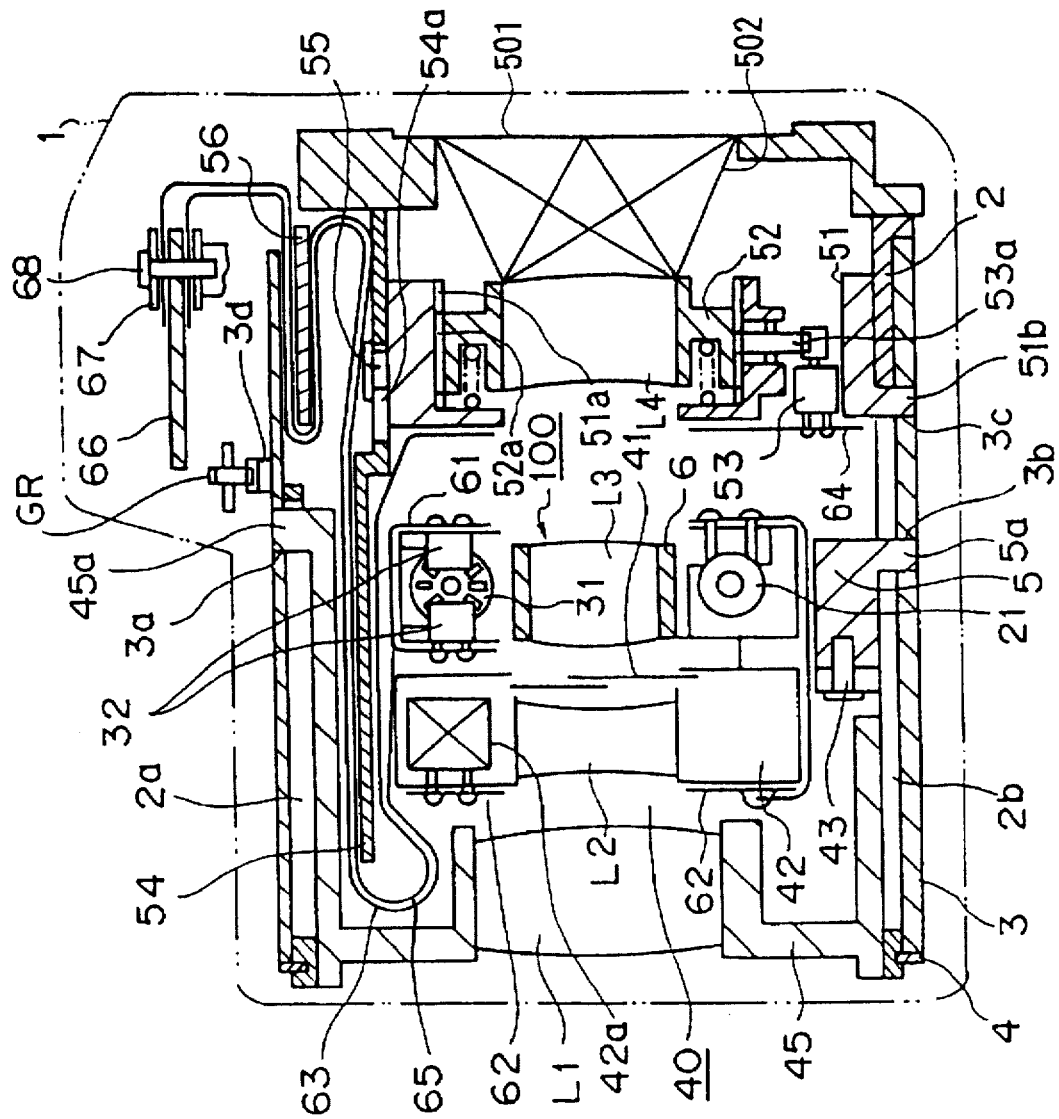
FIG. 16 is a cross section of a camera that is provided with the lens barrel in the fifth embodiment according to the present invention.
Figure 17:
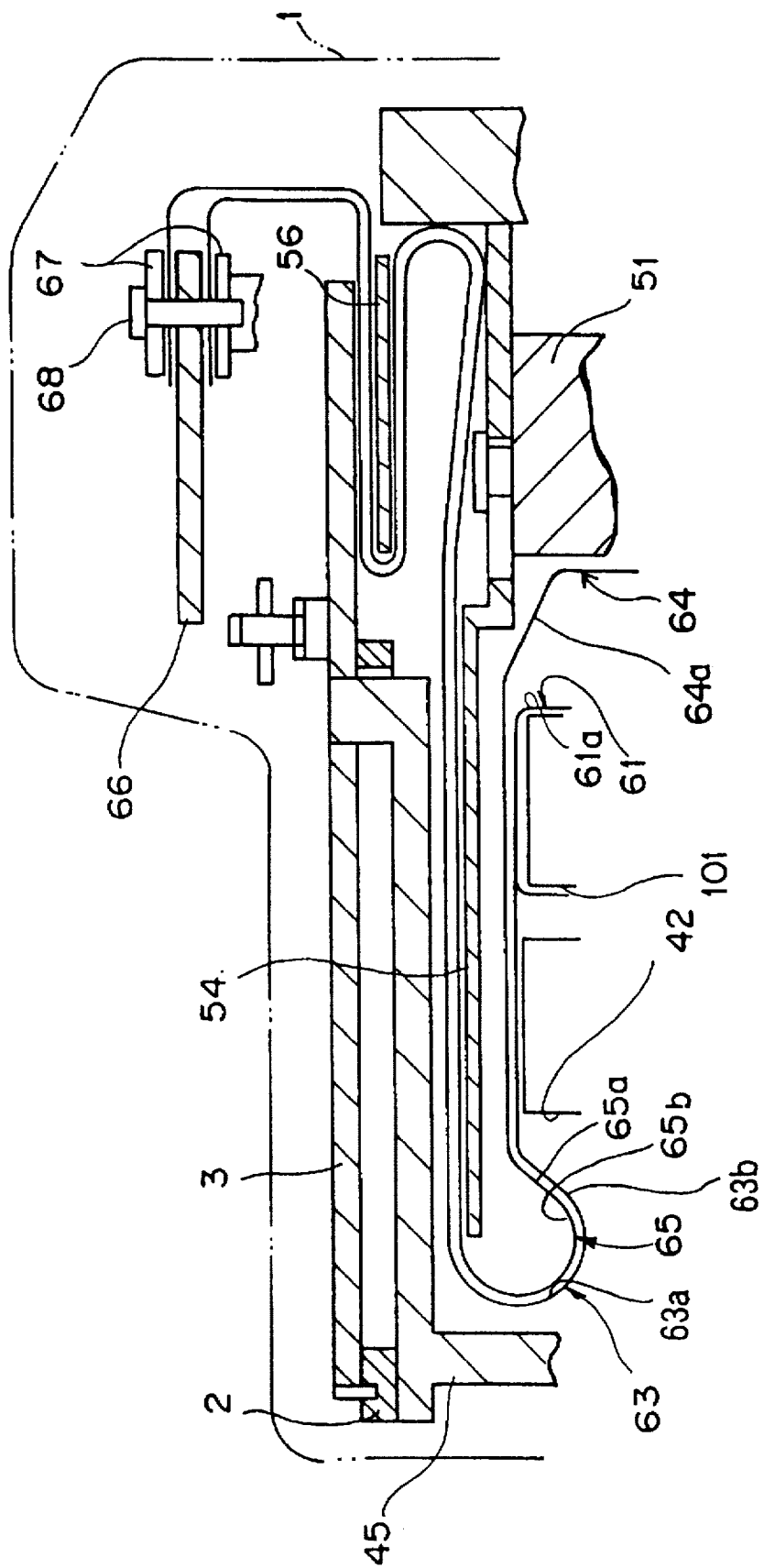
FIG. 17 is an enlargement of the essential part of FIG. 16.

The fifth embodiment according to the present invention is explained in reference to FIGS. 16 and 17. Note that the same reference numbers are assigned to members that are identical to those shown in the figures used for the earlier embodiments and the differences from those embodiments are explained here.

In FIG. 16, one end of the FPC 63 for connecting the X and Y direction motors 21 and the various photo interrupters 32 to a driver outside the lens barrel, is connected to the blur prevention FPC 61, on which those electrical devices are mounted by soldering. One end of the focusing FPC 65 that connects the focusing motor 53 to the driver outside the lens barrel is connected to the board 64, on which the focusing motor 53 is mounted by soldering.

The focusing FPC 65, as shown in the enlargement in FIG. 10, is led out toward the front of the camera after passing through the space between the blur prevention device 100 and the lens shutter mechanism 40, and the FPC guide member 54. Then it is bent backwards, maintaining the relationship in which it and the aforementioned shutter FPC 63 are arranged one on top of the other. On one surface of each of the FPCs 63, 65, a conductive pattern is formed and the FPCs 63, 65 are connected to mounting boards in such a manner that the surfaces on which these conductive patterns are formed (cover lay surfaces) 63a, 65a face the same direction as the soldered surfaces 61a, 64a of the blur prevention FPC 61 and the mounting board 64 (the right side surface in the case of the FPC 61 and the left side surface in the case of the mounting board 64). Consequently, these FPCs 63, 65 are arranged one on top of the other in such a manner that the cover lay surfaces 63a, 65a face opposite each other.

The FPCs 63, 65, which are bent toward the rear of the camera, pass through the space between the FPC guide member 54 and the lens base 45 while maintaining the relationship in which one is on top of the other, and are then led toward the rear of the camera. Then they are bent back again toward the front of the camera. Next, after being bent backwards again at the front end of the FPC guide member 56, the FPCs 63, 65 travel through the space between the FPC guide member 56 and the cam cylinder 3 to be led out to the outside of the lens barrel where their front ends are led up to the upper portion of the camera main body 1.

The board 66 on which the control IC71 shown in FIG. 5 is mounted, is provided in the upper portion of the camera main body 1. The front ends of the FPCs 63, 65 are bent twice as shown in the figure, and the FPC 63 is led to the lower surface of the board 66 while the FPC 65 is led to the upper surface of the board 66. Then, the front ends of the two FPCs 63, 65 are pressure connected to the upper and lower surfaces respectively of the board 66 with a pair of hold-down plates 67 and one mounting screw 68. In this embodiment, the electrical device 42a for shutter drive is connected to the shutter driver 73 via the mounting board 42, the FPC 61 and the FPC 63.

The other structural aspects of this embodiment are identical to those in the first and second embodiments.

In this embodiment, advantages similar to those achieved by the first and second embodiments are achieved. In particular, since the two FPCs 63, 65 are arranged one on top of the other in such a manner that the cover lay surfaces 63a, 65a of the two FPCs 63, 65 face opposite each other, the front ends of FPCs 63, 65 which are led out to the outside of the lens barrel, can be connected by pressure connection to the upper and lower surfaces of the board 66 without becoming twisted, with just one screw 68, as shown in FIG. 4, which further improves the efficiency in assembly.

In the embodiments described so far, the two FPCs 63, 65 are arranged one on top of the other. However, three or more FPCs that are integrated with three or more corresponding lens groups may be provided one on top of another. Also, the electrical devices within the lens barrel are not limited to those described above and they may be, for example, encoders for detecting the focal length of the zoom lens and for detecting the position of the focusing lens. Furthermore, in these embodiments, the electrical devices within the lens barrel are mounted on the boards 62, 64 and one end of each of the FPCs 63, 65 is connected to either the board 62 or 64. However, the electrical devices may be mounted on an FPC which is integrated with the FPCs 63, 65 instead of the boards 62, 64. Also, while in the explanation of these embodiments is made on the basis of an integrated lens type camera, the present invention may also be applied, for example, to a removable lens mounted on a single lens reflex camera. In that case, the present invention may take a structure in which the front ends of a plurality of FPCs, which are arranged one on top of another, are connected to a contact point within the removable lens and when the removable lens is mounted in the camera main body, the electrical devices within the lens barrel become connected to an electrical device within the camera main body via this contact point and a contact point on the camera main body side.

We claim:

1. A lens barrel comprising:

a lens group movable in a direction of an optical axis thereof;

a first electrical device which is integrated with said lens group;

an electrical circuit board provided outside said lens barrel, on which a second electrical device is mounted; and a plurality of flexible printed circuit boards, each of which has a conductive pattern formed on a front surface to electrically connect said first electrical device to said second electrical device, said plurality of flexible printed circuit boards extending in the direction of said optical axis and being bent a plurality of times in a state of one on top of the other in a direction perpendicular to said optical axis, wherein connecting portions of two flexible printed circuit boards among said plurality of flexible printed circuit boards are connected to front and rear surfaces of said electrical circuit board respectively to put said electrical circuit board therebetween.

2. A lens barrel comprising:

first and second lens groups that are positioned coaxially to each other within said lens barrel;

first and second electrical devices that are integrated with said first and second lens group respectively;

an electrical circuit board provided outside said lens barrel, on which a third electrical device is mounted; and first and second flexible printed circuit boards, each of which has a conductive pattern formed on a front surface to electrically connect said first and second electrical devices to said third electrical device, said first and second flexible printed circuit boards extending in the direction of the optical axis and being bent a plurality of times in a state of one on top of the other in a direction perpendicular to said optical axis, wherein connecting portions of said first and second flexible printed circuit boards are connected to front and rear surfaces of said electrical circuit boards respectively to put said electrical circuit board therebetween.

3. A lens barrel according to claim 2 further comprising;

an interval changing mechanism that changes an interval between said first and second lens groups by driving at least one of said first and second lens groups in a direction of an optical axis.

4. A lens barrel according to claim 2 wherein;

said first and second electrical devices are mounted on first and second mounting boards respectively that are integrated with said first and second lens groups respectively, and one end of each of said first and second flexible printed circuit boards is connected to said first and second mounting boards respectively, and the other ends of said first and second flexible printed circuit boards are connected to a mounting board provided outside said lens barrel, to which said third electrical device is mounted.

5. A lens barrel according to claim 2 wherein said first and second flexible printed circuit boards are disposed outside a photographic optical path.

6. A lens barrel according to claim 2 wherein;

said first and second flexible printed circuit boards are configured to bend forward and backward in said lens barrel a plurality of times while maintaining a relationship in which said first and second flexible printed circuit boards are arranged one on top of the other.

7. A lens barrel according to claim 6 further comprising;

an egress space through which said first and second flexible printed circuit boards are led out to the outside of said lens barrel while maintaining the relationship in which said first and second flexible printed circuit boards are arranged one on top of the other.

8. A lens barrel according to claim 6 further comprising;

a guide member that guides said first and second flexible printed circuit boards in such a manner that said first and second flexible printed circuit boards are extended in a direction of the optical axis of said first and second lens groups.

9. A lens barrel according to claim 2 wherein;

said first lens group includes a blur prevention lens which can move in a direction different from an optical axis of said first lens group in order to prevent image blur caused by a vibration of a camera.

10. A lens barrel according to claim 9 wherein;

said first electrical device includes an electrical device for driving said blur prevention lens and an electrical device for shutter drive, and said second electrical device includes an electrical device for focusing.

11. A lens barrel according to claim 10 wherein;

said third electrical device is a control device that controls operations of said first and second electrical devices.

12. A lens barrel according to claim 2 wherein;

said first and second flexible printed circuit boards are arranged one on top of the other in such a manner that rear surfaces of said first and second flexible printed circuit boards, on each of which no conductive pattern is formed, face opposite each other.

13. A lens barrel according to claim 12 wherein;

said first electrical device is connected with said first flexible printed circuit board at a front side of a holding member that holds said first lens group, and said second electrical device is connected with said second flexible printed circuit board at a rear side of a holding member that holds said second lens group.

14. A lens barrel according to claim 12 wherein said first and second flexible printed circuit boards are disposed outside a photographic optical path.

15. A lens barrel according to claim 12 wherein;

said first and second flexible printed circuit boards are configured to bend forward and backward in said lens barrel a plurality of times while maintaining a relationship in which said first and second flexible printed circuit boards are arranged one on top of the other.

16. A lens barrel according to claim 15 further comprising;

an egress space through which said first and second flexible printed circuit boards are led out to the outside of said lens barrel while maintaining the relationship in which said first and second flexible printed circuit boards are arranged one on top of the other.

17. A lens barrel according to claim 12 further comprising;

a bending guide member along which said first and second flexible printed circuit boards which are arranged one on top of the other are bent, and a clip member that clamps bent portions of said first and second flexible printed circuit boards to said bending guide member.

18. A lens barrel according to claim 2 wherein;

said first electrical device is connected with said first flexible printed circuit board at a front side of a holding member that holds said first lens group, and said second electrical device is connected with said second flexible printed circuit board at the front side of a holding member that holds said second lens group.

19. A lens barrel according to claim 2 wherein said first and second flexible printed circuit boards are disposed outside a photographic optical path.

20. A lens barrel according to claim 2 wherein;

said first and second flexible printed circuit boards are configured to bend forward and backward in said lens barrel a plurality of times while maintaining a relationship in which said first and second flexible printed circuit boards are arranged one on top of the other.

21. A lens barrel according to claim 20 further comprising;

an egress space through which said first and second flexible printed circuit boards are led out to the outside of said lens barrel while maintaining the relationship in which said first and second flexible printed circuit boards are arranged one on top of the other.

22. A lens barrel according to claim 2 wherein;

said first and second flexible printed circuit boards are arranged one on top of the other in such a manner that front surfaces of said first and second flexible printed circuit boards, on each of which said conductive pattern is formed, face opposite each other.

23. A lens barrel according to claim 22 wherein;

said first electrical device is connected with said first flexible printed circuit board at a rear side of a holding member that holds said first lens group, and said second electrical device is connected with said second flexible printed circuit board at a front side of a holding member that holds said second lens group.

24. A lens barrel according to claim 22 wherein said first and second flexible printed circuit boards are disposed outside a photographic optical path.

25. A lens barrel according to claim 22 wherein;

said first and second flexible printed circuit boards are configured to bend forward and backward in said lens barrel a plurality of times while maintaining a relationship in which said first and second flexible printed circuit boards are arranged one on top of the other.

26. A lens barrel according to claim 25 further comprising;

an egress space through which said first and second flexible printed circuit boards are led out to the outside of said lens barrel while maintaining the relationship in which said first and second flexible printed circuit boards are arranged one on top of the other.

27. A lens barrel according to claim 12, wherein:

front surfaces of said connecting portions, each on which said conductive pattern is formed, face each other.

28. A lens barrel according to claim 22, wherein:

front surfaces of said connecting portions, each on which said conductive pattern is formed, face each other.

29. A lens barrel comprising:

a blur prevention drive mechanism that electrically drives a blur prevention optical system which constitutes a photographic lens in a direction different from a direction of an optical axis of said blur prevention optical system in order to prevent blurring of a photographic image;

a shutter device mechanism that is integrated with said blur prevention drive mechanism and which electrically drives a lens shutter;

a focusing mechanism that performs focusing by electrically driving a focusing optical system that constitutes said photographic lens;

an electrical circuit board provided outside a lens barrel, on which an electrical control device is mounted;

a first flexible printed circuit board that connects drive sources of said blur prevention drive mechanism and said shutter drive mechanism to said electrical control device; and a second flexible printed circuit board that connects a drive source of said focusing mechanism to said electrical control device, wherein connecting portions of said first and second flexible printed circuit boards are connected to front and rear surfaces of said electrical circuit board respectively to put said electrical circuit board therebetween.

30. A lens barrel according to claim 29 further comprising;

a first base that is integrated with said blur prevention drive mechanism and said shutter drive mechanism, and which holds said blur prevention optical system in such a manner that said blur prevention optical system can move in a direction different from a direction of said optical axis, a second base that is integrated with said focusing mechanism, and which holds said focusing optical system in such a manner that said focusing optical system can move in a direction of said optical axis, and a zooming mechanism that changes an interval between said blur prevention optical system and said focusing optical system by driving said first and second bases in the direction of said optical axis in order to change a focal length of said photographic lens.

31. A lens barrel according to claim 29 wherein;

said first and second flexible printed circuit boards are provided in a space within said lens barrel in a relationship in which said first and second flexible printed circuit boards are arranged one on top of the other.

32. A lens barrel comprising:

first and second lens groups that are positioned coaxially to each other in said lens barrel, first and second electrical devices that are integrated with said first and second lens groups respectively, first and second flexible printed circuit boards, each of which having a conductive pattern formed on one surface to electrically connect said first and second electrical devices to a third electrical device outside said lens barrel, said first and second flexible printed circuit boards extending in the direction of the optical axis and being bent a plurality of times in a state of one on top of the other in a direction perpendicular to said optical axis, a bending guide member along which said first and second flexible printed circuit boards which are arranged one on top of the other are bent, and a clip member which clamps bent portions of said first and second flexible printed circuit boards to said bending member.

33. A lens barrel according to claim 32 further comprising;

an interval changing mechanism that changes an interval between said first and second lens groups by driving at least one of said first and second lens groups in a direction of an optical axis.

34. A lens barrel according to claim 32 wherein;

said first lens group includes a blur prevention lens which can move in a direction different from a direction of an optical axis of said first lens group in order to prevent image blur caused by a vibration of a camera.

35. A lens barrel according to claim 34 wherein;

said first electrical device includes an electrical device for driving said blur prevention lens and an electrical device for shutter drive, and said second electrical device includes an electrical device for focusing.

36. A lens barrel according to claim 35 wherein;

said third electrical device is a control device that controls operations of said first and second electrical devices.

37. A lens barrel comprising:

a first lens unit;

a second lens unit which is positioned coaxially with said first lens unit and which is moveable relative to said first lens unit in a direction of an optical axis thereof;

a support plate which is held in said second lens unit so as to be able to move in the direction of said optical axis relative to said second lens unit, and extends in the direction of said optical axis;

a first electrical device which is integrated with said first lens unit; and a first flexible printed circuit board that electrically connects said first electrical device to an electrical device provided outside of said lens barrel, said first flexible printed circuit board extending along one surface of said support plate in the direction of said optical axis, being bent at one end of said support plate and extending along another surface of said support plate in the direction of said optical axis.

38. A lens barrel according to claim 37 further comprising:

a second electrical device which is integrated with said second lens unit;

a second flexible printed circuit board that electrically connects said second electrical device to said electrical device provided outside of said lens barrel, said second flexible printed circuit board extending along one surface of said support plate in the direction of said optical axis, being bent at one end of said support plate and extending along another surface of said support plate in the direction of said optical axis, wherein said first and second flexible printed circuit boards are arranged on top of the other.

39. A lens barrel according to claim 38 wherein;

said first and second flexible printed circuit boards are arranged one on top of the other in such a manner that the front surface of one of said first or second flexible printed circuit boards, on which a conductive pattern is formed, face opposite the rear surface of the other, on which no conductive pattern is formed.

40. A lens barrel comprising:

first and second lens groups that are positioned coaxially to each other;

first and second electrical devices integrated with said first and second lens groups respectively;

first and second flexible printed circuit boards, each of which having a conductive pattern formed on one surface thereof and which are arranged one on top of the other to electrically connect said first and second electrical devices to an electrical device provided outside said lens barrel;

a bending guide member along which said first and second flexible printed circuit boards which are arranged one on top another are bent, said bending guide member having a connecting pin projected on one surface thereof, which passes through said first and second flexible printed circuit boards to position both flexible printed circuit boards;

a clip member which clamps bent portions of said first and second flexible printed circuit boards to said bending guide member, and through which said connecting pin passes.

41. A lens barrel according to claim 40, further comprising:

a guide cylinder that guides said first and second lens groups in a direction of an optical axis, and wherein said bending guide member is formed in said guide cylinder.

42. A lens barrel, comprising:

first and second lens groups that are positioned coaxially to each other within said lens barrel;

first and second electrical devices that are integrated with said first and second lens groups respectively;

an electrical circuit board provided outside said lens barrel, on which a third electrical device is mounted; and first and second flexible printed circuit boards, each of which has a conductive pattern formed on one surface to electrically connect said first and second electrical devices to said third electrical device, said first and second flexible printed circuit boards extending in the direction of the optical axis, being bent plurality of times in a state of one on top of the other in the direction perpendicular to said optical axis and being connected to one surface of said electrical circuit board.

* * * * *